US009471885B1

(12) United States Patent
Rubin

(10) Patent No.: US 9,471,885 B1
(45) Date of Patent: Oct. 18, 2016

(54) PREDICTOR-CORRECTOR METHOD FOR KNOWLEDGE AMPLIFICATION BY STRUCTURED EXPERT RANDOMIZATION

(71) Applicant: The United States of America as represented by the Secretary of the Navy, Washington, DC (US)

(72) Inventor: Stuart H. Rubin, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 382 days.

(21) Appl. No.: 14/311,486

(22) Filed: Jun. 23, 2014

(51) Int. Cl.
G06F 15/18 (2006.01)
G06N 99/00 (2010.01)

(52) U.S. Cl.
CPC .................. *G06N 99/005* (2013.01)

(58) Field of Classification Search
USPC ............................................................ 706/14
See application file for complete search history.

(56) References Cited

U.S. PATENT DOCUMENTS

| 7,047,226 | B2 | 5/2006 | Rubin | |
|---|---|---|---|---|
| 8,073,804 | B1 | 12/2011 | Rubin | |
| 8,117,147 | B1 | 2/2012 | Rubin | |
| 8,155,949 | B1* | 4/2012 | Rubin | G06F 17/30401 704/9 |
| 8,176,031 | B1* | 5/2012 | Rubin | G06F 17/3033 707/706 |
| 8,250,022 | B1 | 8/2012 | Rubin | |
| 8,280,831 | B1* | 10/2012 | Rubin | G06N 5/04 706/12 |
| 8,285,728 | B1 | 10/2012 | Rubin | |
| 8,315,958 | B1 | 11/2012 | Rubin | |
| 8,374,765 | B1* | 2/2013 | Rubin | B60W 30/18 701/70 |
| 8,423,487 | B1* | 4/2013 | Rubin | G01W 1/00 114/312 |
| 8,447,720 | B1* | 5/2013 | Rubin | G06N 5/025 706/46 |
| 8,655,799 | B1* | 2/2014 | Rubin | G06N 3/126 700/28 |
| 8,780,195 | B1* | 7/2014 | Rubin | H04N 7/18 348/114 |
| 8,862,621 | B1* | 10/2014 | Rubin | G06F 17/30539 707/776 |

(Continued)

OTHER PUBLICATIONS

Energy Availability Forecasting for Harvesting-aware Wireless Sensor Networks: Analysis of Energy Demand of a Predictor Based on Evolutionary Fuzzy Rules Michal Prauzek; Petr Musilek; Pavel Krömer; James Rodway; Martin Stankus; Jakub Hlavica Intelligent Networking and Collaborative Systems (INCOS), 2015 International Conference on Year: 2015.*

(Continued)

*Primary Examiner* — Michael B Holmes
(74) *Attorney, Agent, or Firm* — SPAWAR Systems Center Pacific; Kyle Eppele; Ryan J. Friedl

(57) ABSTRACT

A method involves using a predictor rule base and a corrector rule base to map an acquired context to a rule when the context may not be completely covered by a rule. All involved rules may be non-deterministic. Non-deterministic predictor consequents provide the context for the corrector rule base, while the associated consequent is the correct action to be taken. A minimal of predicates is deleted from every rule in the predictor or corrector base to obtain a contextual covering of at least one rule in the predictor or corrector base. Each produced action may be associated with a possibility metric, which is inversely proportional to the maximum percentage of deleted antecedent predicates produced in matching any single rule in the predictor and corrector bases. The generalized matching capability allows systems to be arranged in a networked system of systems where each system is a domain-specific knowledgebase segment.

20 Claims, 5 Drawing Sheets

(56) References Cited

U.S. PATENT DOCUMENTS

| | | | |
|---|---|---|---|
| 8,955,325 B1* | 2/2015 | Rubin | F23C 99/001 60/202 |
| 9,299,025 B1* | 3/2016 | Rubin | G06N 5/025 |
| 9,330,358 B1* | 5/2016 | Rubin | G06N 5/04 |
| 9,396,441 B1* | 7/2016 | Rubin | G06N 99/005 |

OTHER PUBLICATIONS

On-Chip Droop-Induced Circuit Delay Prediction Based on Support-Vector Machines Fangming Ye; Farshad Firouzi; Yang Yang; Krishnendu Chakrabarty; Mehdi B. Tahoori IEEE Transactions on Computer-Aided Design of Integrated Circuits and Systems Year: 2016, vol. 35, Issue: 4 pp. 665-678, DOI: 10.1109/TCAD.2015. 2474392 IEEE.*

Software Defect Prediction Using Exception Handling Call Graphs: A Case Study Puntitra Sawadpong; Edward B. Allen 2016 IEEE 17th International Symposium on High Assurance Systems Engineering (HASE) Year: 2016 pp. 55-62, DOI: 10.1109/HASE.2016. 13 IEEE Conference Publications.*

On-chip voltage-droop prediction using support-vector machines Fangming Ye; Farshad Firouzi; Yang Yang; Krishnendu Chakrabarty; Mehdi B. Tahoori 2014 IEEE 32nd VLSI Test Symposium (VTS) Year: 2014 pp. 1-6, DOI: 10.1109/VTS.2014. 6818798 IEEE Conference Publications.*

Rubin, Stuart H., "On Randomization and Discovery", Journal of Informational Sciences, vol. 177, issue 1, pp. 170-191, Jan. 2007.

Rubin, Stuart H., "Computing With Words", IEEE Transactions on Systems, Man, and Cybernetics—Part B: Cybernetics, vol. 29, No. 4, pp. 518-524, Aug. 1999.

Rubin, S.H., Murthy, S.N.J., Smith, N.H., and Trajkovic, L., "KASER: Knowledge Amplification by Structured Expert Randomization," IEEE Transactions on Systems, Man, and Cybernetics—Part B: Cybernetics, vol. 34, No. 6, pp. 2317-2329, Dec. 2004.

Chaitin, G.J., "Randomness and Mathematical Proof," Sci. Amer., vol. 232, No. 5, pp. 47-52, 1975.

Rubin, Stuart H., Chen, S., and Shyu, M., "Field Effect Natural Language Semantic Mapping", IEEE International Conference on Systems, Man, and Cybernetics, vol. 3, pp. 2483-2487, Oct. 5-8, 2003.

* cited by examiner

PREDICTOR-CORRECTOR METHOD FOR KNOWLEDGE AMPLIFICATION BY STRUCTURED EXPERT RANDOMIZATION

FEDERALLY SPONSORED RESEARCH AND DEVELOPMENT

The Predictor-Corrector Method for Knowledge Amplification by Structured Expert Randomization is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email ssc_pac_T2@navy.mil. Reference Navy Case No. 102319.

BACKGROUND

Amplifying existing knowledge, while maintaining validity, is fundamental to human reasoning, decision making, and the advancement of science. No matter how many rules a conventional expert system has, there will always be knowledge that is not contained by its knowledge base. As a practical matter, the allowable size of a knowledge base is relatively small. Segmenting the knowledge base helps, but it can still grow to be of unmanageable size. A need exists for a system and corresponding methodology that provides for capturing and amplifying existing knowledge while not requiring excessive data storage space.

DETAILED DESCRIPTION OF SOME EMBODIMENTS

Figure 1:
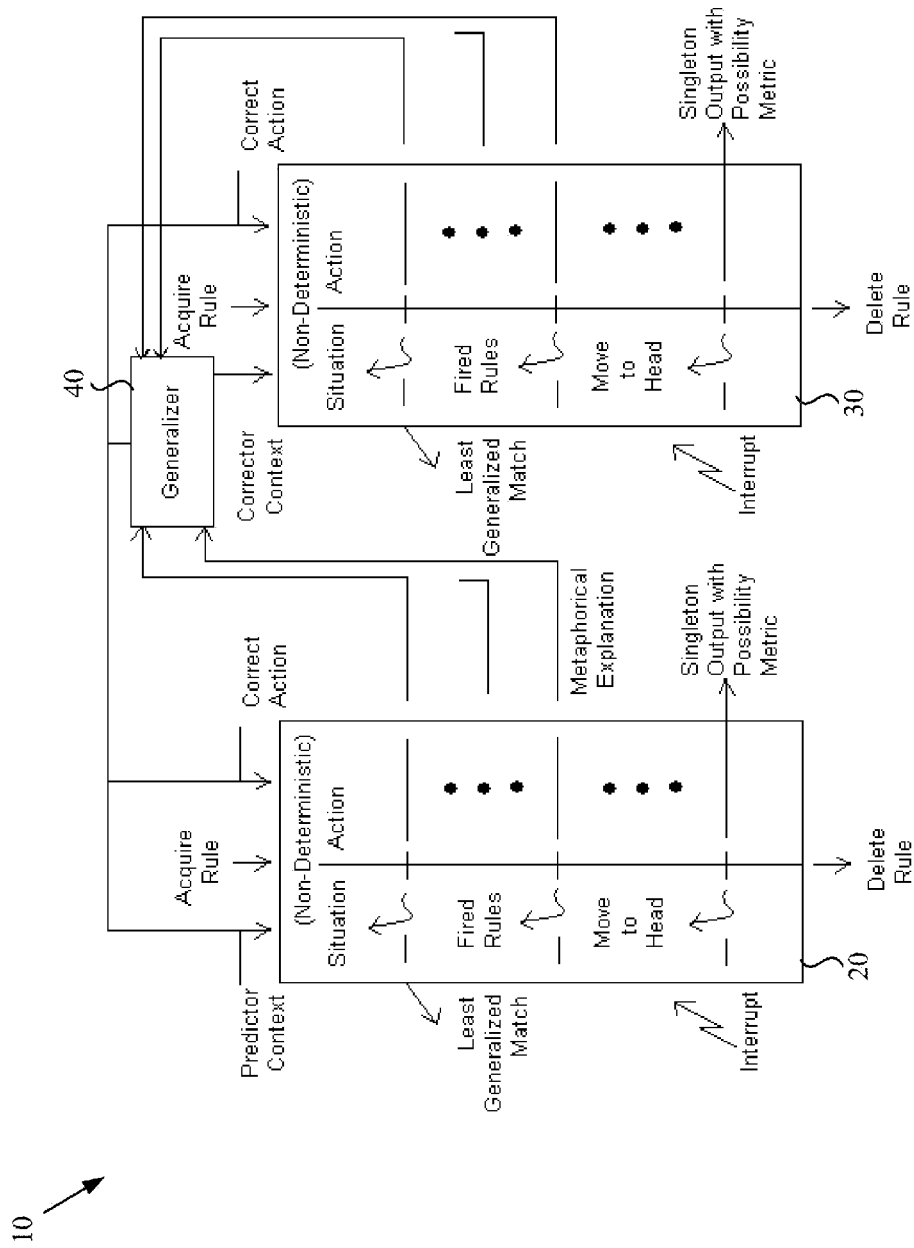
FIG. 1 shows a block diagram of the operation of one embodiment of a system in accordance with the Predictor-Corrector Method for Knowledge Amplification by Structured Expert Randomization.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Further, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the disclosed embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. Different parts of the algorithm could be embodied in different elements of hardware or software, for example, as in a distributed system.

The subject matter discussed herein pertains to a system and method that enable the qualitatively fuzzy mapping of situations to knowledge and learn to correct such erroneous mappings so that analogical knowledge emerges from (non-deterministic) predictor-corrector rule bases. Particularly, the disclosed subject matter pertains to how to map a context to a rule base, when the situational parts of the rules may not be completely covered.

Figure 2:
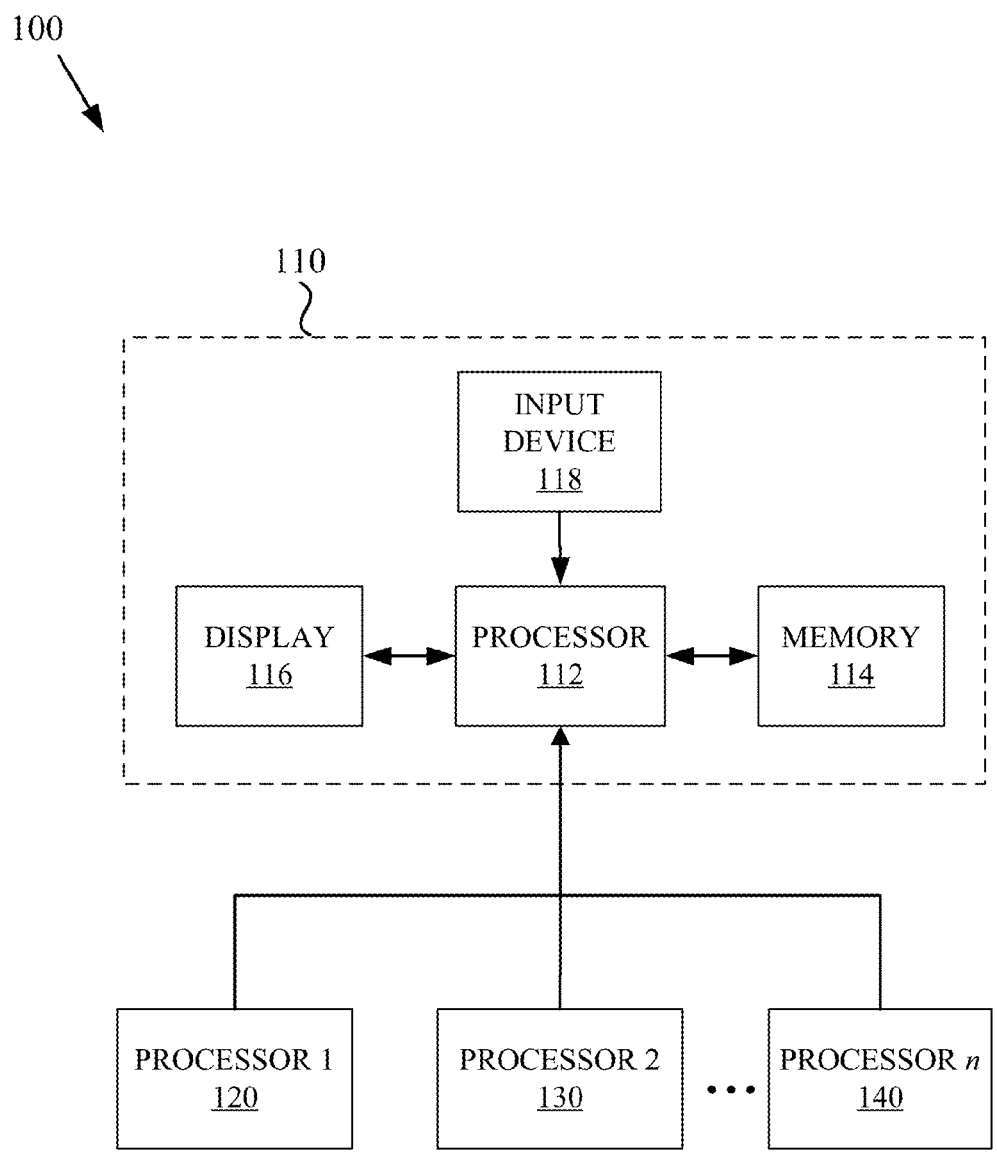
FIG. 2 shows a block diagram of an embodiment of a distributed processor system in accordance with the Predictor-Corrector Method for Knowledge Amplification by Structured Expert Randomization.

Referring now to FIG. 1, FIG. 1 shows a block diagram of one embodiment of a system 10 that may be used in accordance with the methods described herein. System 10 may include a predictor case base 20 and a corrector case base 30. Predictor case base 20 and corrector case base 30 may each comprise a plurality of cases having one or more antecedents (situations) and one or more associated consequents (actions). The cases stored in the case base include case antecedents and case consequents, both of which may be previously supplied by a user, either during training of the system or during real-time system operation. Antecedents may be comprised of one or more independent variables that may include, for example, Boolean and non-Boolean variables. Consequents may comprise a domain specific dependency variable. As an example, the case bases may be stored in memory within a computing system such as shown in FIG. 2. In some embodiments, the case bases are initially empty and cases are acquired and stored as discussed herein.

Figure 4A:
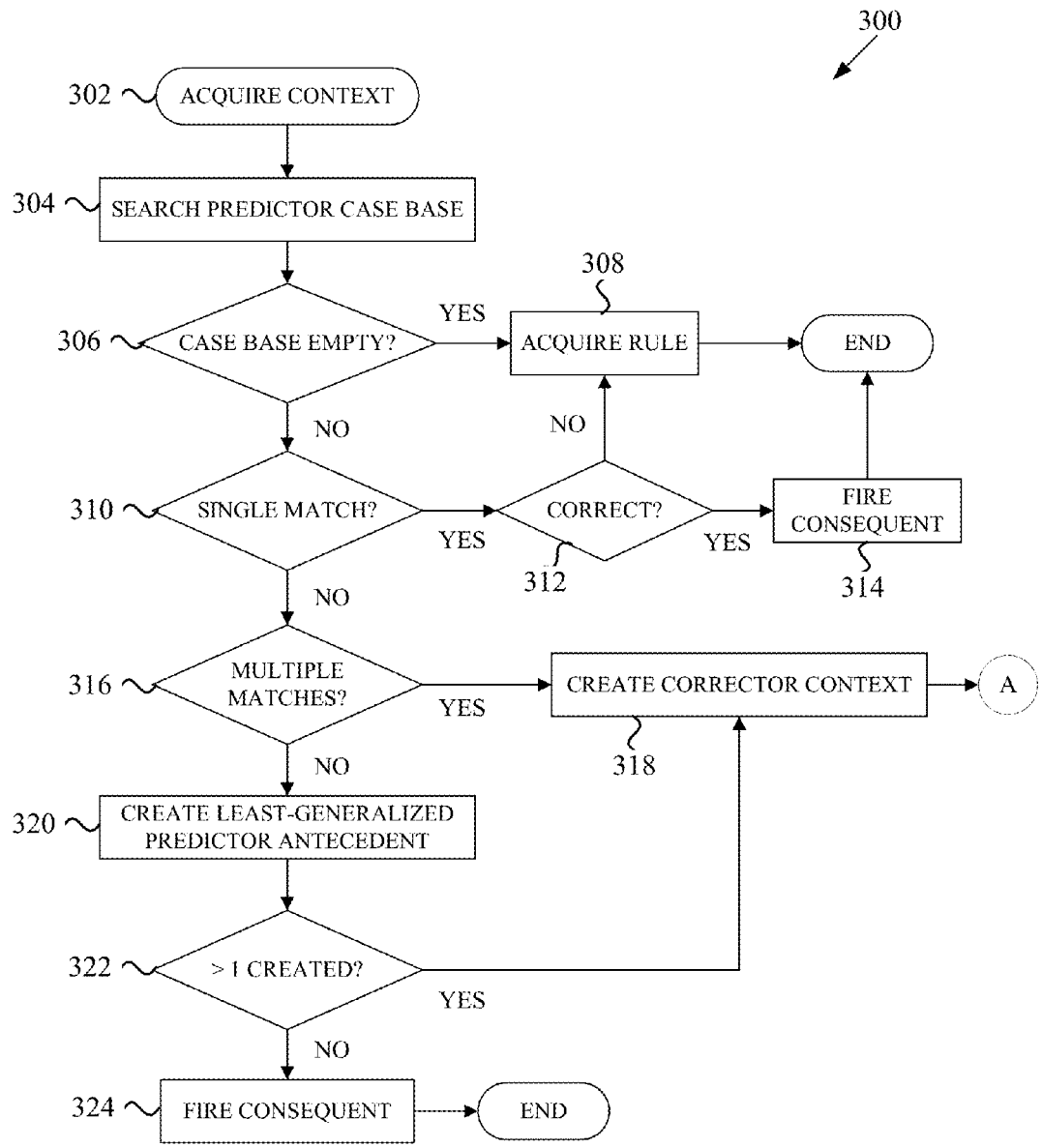
FIGS. 4A and 4B show flowcharts of an embodiment of a method in accordance with the Predictor-Corrector Method for Knowledge Amplification by Structured Expert Randomization.
Figure 4B:
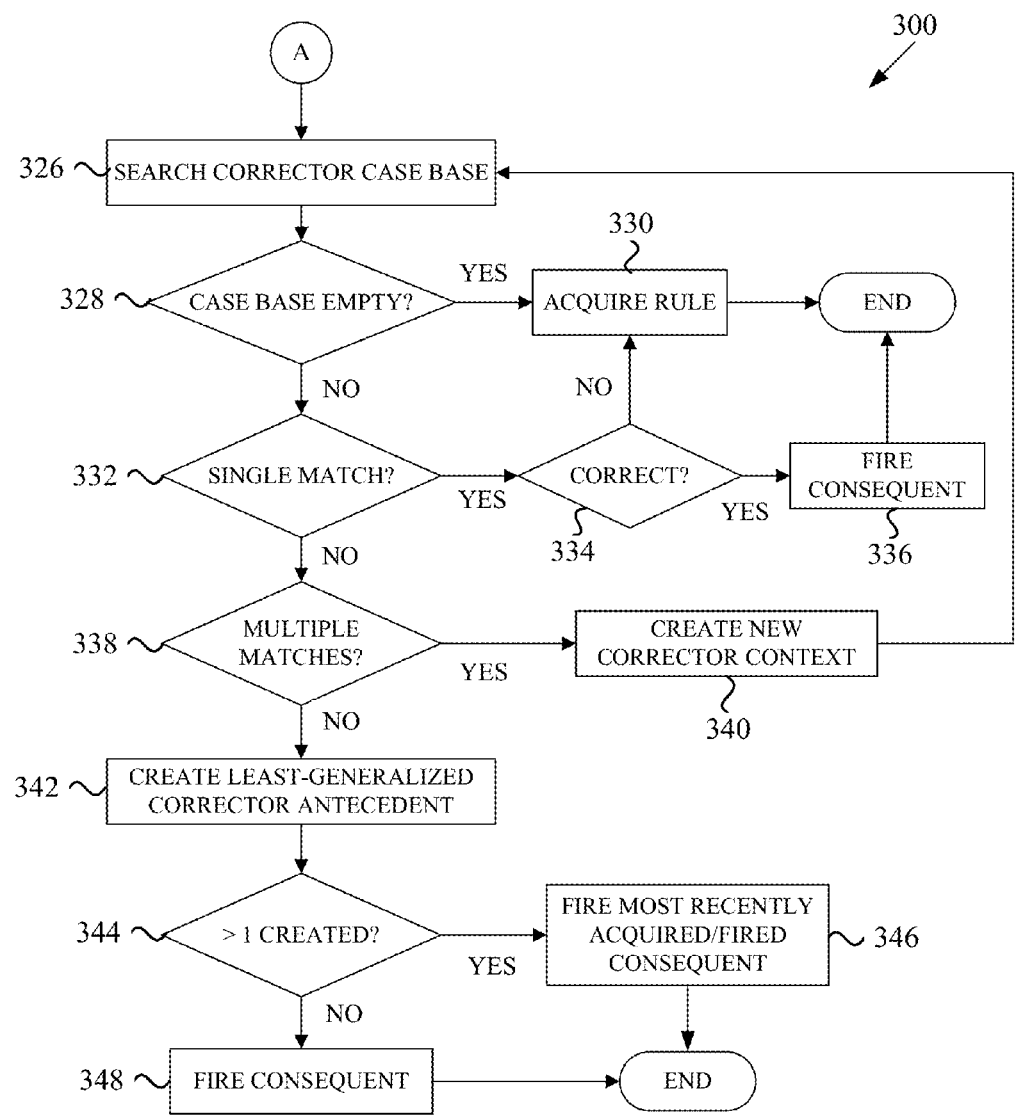

Although an embodiment of the method is discussed in greater detail with respect to FIGS. 4A and 4B, in general operation, a user-supplied context is acquired and compared against cases stored in predictor case base 20. The user-supplied context may comprise one or more contextual antecedents, which are compared to the one or more predictor case antecedents stored in the predictor case base. A predictor case involving the best match of the case antecedents with the contextual antecedents is then determined, if any. If no matches are found, predictor consequents may be used to form a corrector context that is used for searching of the corrector case base. The consequent of the best match corrector case to the corrector context selected is fired. This may involve, for example, displaying an action to a user or prompting a question. If the displayed consequent is not a question, the selected case is moved to the head of the case base, as indicated in FIG. 1. In the event memory constraints occur, least-frequently-used cases are deleted from the tail of the case base, as indicated (or moved to a backup secondary memory device such as an optical jukebox). In some embodiments, in a training mode, the system may display, in addition to the case consequent(s) an explanation of the case antecedent(s) that were matched with the contextual antecedent(s) supplied by the user.

Some general rules that may be implemented into the system and method disclosed herein may include: 1) cases may be learned if the user agrees with the consequent or not—so long as they do not duplicate an existing case, in which case the existing case is simply moved to the head of the queue; 2) cases are moved to the head of the queue so that the most-recently referenced case will break any ties among cases having the same computed possibility and so that the least-recently referenced cases will fall to the tail where they may be expunged with minimal functional loss; 3) consequents that ask a question, however, are not moved to the head because they are not as valuable as regular cases when (if) case memory fills up; and 4) consequents may be specified as "unknown" for consideration for subsequent specification (or not), when they may become known.

FIG. 2 shows a block diagram of an embodiment of a distributed processor system 100 in accordance with the methods disclosed herein. The speed of a case-based reasoning system can be increased through the use of associative memory and/or parallel (distributed) processors, such as shown in FIG. 2. Furthermore, an increase in speed can be obtained if information stores are subdivided for the case knowledge by domain for threaded parallel processing. This is known as segmenting the domain. Such segmentation can be automatically managed by inferred symbolic heuristics, but this will necessarily introduce much redundancy into the system—albeit brain-like. The idea here is to match the candidate case to be acquired against the dynamic case residing at the head of each segment. This case is acquired by those segments, whose head most-closely (not perfectly) matches it based on their possibilities.

Moreover, it is acquired by all segments whose current head is within δ of this new case, where δ is dynamically defined by the minimal possibility differential among case-base heads. However, whenever the computed possibility between the new case and the case-base heads is greater than the current maximum among case-base heads, δ, so that the new case falls outside of existing segments, the case is acquired by creating a new segment (i.e., given sufficient parallel nodes/space)—otherwise, the least-recently—used (LRU) segment is expunged and replaced. Thus, a system, such as system 10 or 100, may be cold-started with a pair of non-redundant segments.

Further, given a system such as system 100, it is possible for one or more computers to chat back and forth with each other if the output of each can serve to augment the input for another. This process is also brain-like because here the cases will acquire knowledge on how to solve a problem (e.g., by way of asking questions)—not just domain-specific knowledge. This respects the mathematical process of randomization. Every consequent (or response to a consequent) may be either terminal or non-monotonic in its action—as determined by whether or not it elicits additional knowledge from the user (or other subsystem) to augment the on-going context. The consequent(s) produced by this iterative feedback process may be corrected, as necessary. This is knowledge amplification because knowledge begets knowledge. That is, knowledge imbued along one path of reasoning becomes subsumed along other paths of reasoning.

Feedback may play a role in the operation of the methods described herein. Feedback takes two forms: 1) consequents may raise questions, the answers to which, supplied by the users, server to augment the context; and 2) the consequents themselves may literally augment the context—again, under user control. The fact that antecedents and consequents can share the same space implies that words for both share the same words table.

Classical set theory does not allow for duplication of elements in the context or antecedent. However, sentential forms are sequence sensitive and thus differ from sets. For example, if I state, "location", you might think of a map; but, if I state, "location, location, location", you might instead think of real estate. The system must be capable of making use of such sequence in matters of practical feedback. However, contextual duplicate words may not be counted because to do so would proportionately decrease the resultant possibility and thus result in a bad case match. Fortunately, not counting duplicates does not change the complexity of the algorithm. The context length is decreased by one for each such duplicate (i.e., when in default mode). Then, notice that traditionally deleterious cycles (e.g., a→a; a→b, b→a; etc.) become an asset because with the aforementioned feedback comes duplication in the context, which as we've witnessed can beneficially alter sentential semantics. This means that there is no need to hash to detect cycles (using stacked contexts) because such cycles are beneficial. Finally, the allowance for cycles implies that there is no need to copy the context into a buffer to facilitate data entry.

As such, system 100 may include a computer 110 having processors 120, 130, and 140 connected thereto. As an example, each of processors 120, 130, and 140 may comprise a separate domain-specific knowledgebase segment and may be networked along with computer 110 to provide a system of systems. Computer 110 may include a processor 112, memory 114, display 116, and input device 118, such as a keyboard or mouse. System 100 may be used to provide an increase in computing capacity by allowing processor 112 to coordinate processors 120, 130, and 140 such that maximum processing capabilities are achieved.

Figure 3:
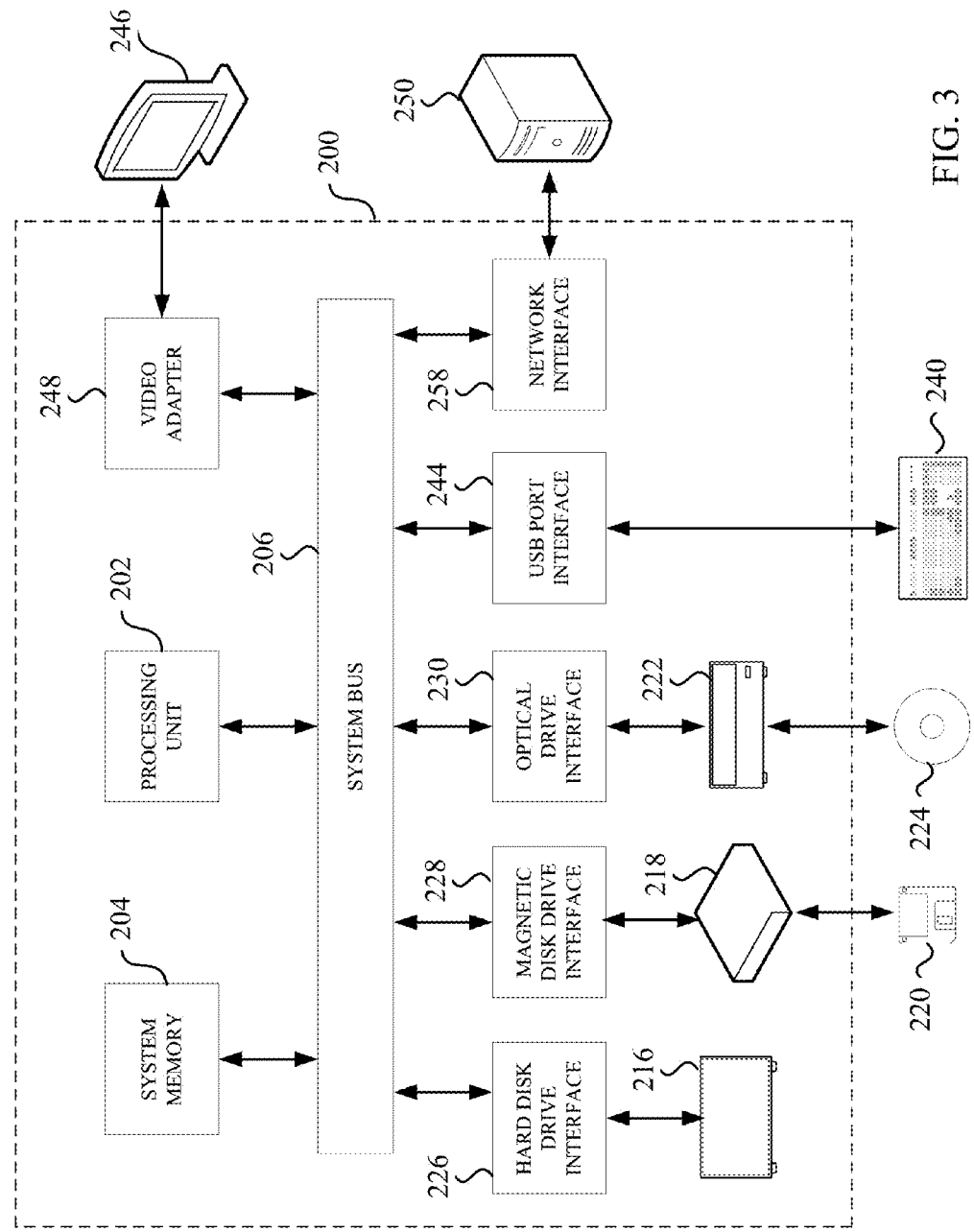
FIG. 3 shows a block diagram of an embodiment of a computing system for implementing and performing a method in accordance with the Predictor-Corrector Method for Knowledge Amplification by Structured Expert Randomization.

FIG. 3 shows a block diagram of an embodiment of a computing system that may be used to implement a method in accordance with the methods disclosed herein. FIG. 3 and the following description are intended to provide a brief, general description of a suitable computing environment in which an embodiment of the method discussed herein may be implemented. Although not required, the method will be described in the general context of computer-executable instructions, such as program modules, being executed by a computer.

Moreover, those skilled in the art will appreciate that embodiments of the method may be practiced with other computer system configurations, including hand-held devices, multiprocessor systems, microprocessor-based or programmable consumer electronics, networked personal computers, minicomputers, mainframe computers, and the like. Embodiments of the method may also be practiced in distributed computing environments where tasks are performed by remote processing devices that are linked through a communications network (such as shown in FIG. 2). In a distributed computing environment, program modules may be located on both local and remote memory storage devices.

System 200 may include a computing device in the form of a computer 200, which includes processing unit 202, system memory 204, and system bus 206 that operatively couple various system components to other system components (e.g., system bus 206 operatively couples system memory 204 to processing unit 202). Examples of system bus 206 include a memory bus, memory bus controller, peripheral bus and local bus using any of a variety of known bus structures. System memory 204 may include read only memory, random access memory, and a basic input/output system.

System 200 further includes hard disk drive 216 for reading from and writing to a hard disk (not shown) a magnetic disk drive 218 for reading from or writing to a removable magnetic disk 220 (e.g., 4.5-inch disk), and an optical disk drive 222 for reading from and writing to a removable optical disk 224 (e.g., CD-ROM and DVD). Hard disk drive 216, magnetic disk drive 218 and optical disk drive 222 are operatively connected to system bus 206 via hard disk drive interface 226, magnetic disk drive interface 228 and optical drive interface 230, respectively. The drives and their associated computer-readable media provide non-volatile storage of computer readable instructions, information structures, program modules and other information for personal computer 200.

The method steps of embodiments may be stored on a hard disk, magnetic disk 220, and optical disk 224. Although the exemplary environment described herein employs a hard disk, magnetic disk 220 and optical disk 224, it should be appreciated by those skilled in the art that other types of computer readable media that may store information accessible by a computer, (e.g., magnetic cassettes, flash memory cards, digital video disks, Bernoulli cartridges, random access memories (RAMs), and read only memories (ROMs)) may also be used in the exemplary operating environment without departing from the scope or spirit of embodiments of the method.

A user may enter commands and information into personal computer 200 via input devices such as keyboard 240 and pointing devices (e.g., mouse and trackball) (not shown in FIG. 3). Examples of input devices include a microphone, joystick, game pad, and satellite dish. Input devices may be operatively connected to processing unit 202 via universal serial bus (USB) port interface 244 that is operatively connected to system bus 206. Input devices may also be operatively connected to processing unit 202 via other interfaces (e.g., parallel port, serial port and game port) that are operatively connected to system bus 206. Monitor 246 is operatively connected to system bus 206 via video adapter 248.

Other peripheral devices (e.g., speakers and printers) may be operatively connected to system 200 via other interfaces. System 200 may operate in a networked environment using logical connections to one or more remote computers such as remote computer 250 via network a network, such as a local area network, wide area network, and wireless network. Examples of remote computer 250 include a personal computer, server, router, networked personal computer, peer device, and network node.

In some embodiments, processors 112, 120, 130, and 140 may be substantially similar and may be configured with the appropriate software modules to perform methods as discussed herein. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof. The terms "module" and "software module" can be utilized interchangeably with one another to describe the same element or feature.

The embodiments described herein may be implemented as a series of modules, either functioning alone or in concert with physical electronic and computer hardware devices. Such modules may be utilized separately and/or together locally and/or remotely to form a program product thereof, that may be implemented through signal-bearing media, including transmission media and recordable media. The methods described herein may be implemented as a program product comprised of a plurality of such modules, which can be interactively displayed for a user on a display screen of a data-processing system (e.g., computer). Such interactivity may be provided by a specialized graphical user interface (not shown).

The embodiments of the system and method disclosed herein will be discussed with reference to two specific applications—one involving weather prediction and one involving assignment of processes to computing resources.

An overarching problem for businesses and governments alike is to make maximal use of their investments in all manner of computing architectures by providing maximal computational resources for minimal cost. This, in turn, requires minimizing the total time for which CPUs sit idle. In other words, an alternative to investing in more hardware is to increase the utilization percentage for existing hardware. A specific problem is how to keep subsets of all these computers busy doing useful work so as to maximize throughput. One could likewise minimize the overall power consumed in running a defined set of processes, or similar, or even combination metrics. Some computers are numerous, but can only solve relatively simple problems (e.g., PCs). Others are few in number, but can multi-process many complex concurrent calculations demanding considerable resources (e.g., supercomputers). Moreover, different computer resources will have distinct addresses—some at considerable geometric distance, where relevant.

The problem may be further described by means of benchmarks. For example, a matrix may be set up that holds the results of actual runs of different software packages executing on different computer architectures as follows.

TABLE 1

Sample Heterogeneous Compute Times

| | Processor 1 | Processor 2 | Processor 3 | Processor 4 |
|---|---|---|---|---|
| SW 1 | 1 | 2 | 3 | 4 |
| SW 2 | 3 | 2 | 4 | — |

TABLE 1-continued

Sample Heterogeneous Compute Times

| | Processor 1 | Processor 2 | Processor 3 | Processor 4 |
|---|---|---|---|---|
| SW 3 | 4 | 5 | 3 | — |
| SW 4 | 5 | — | 7 | 4 |

Notice from Table 1 that the optimal processor and associated time for each software process lies on the diagonal. Also, a dash indicates that the associated processor does not have the resources to run that job. Thus, given parallel processing, all four software processes can be completed in the max time for any of them optimally distributed, or four seconds. Conversely, the worst time would occur if the fourth software process were run on processor 3 (i.e., seven seconds). Each processor has a limited buffer holding from one to n un-started processes. (Time-shared processors may use multi-level feedback queues to run numerous processes on the same core for an iterative quantum.) The mean processor time is computed from the moment it arrives at the accepting buffer.

If the buffer is too large, or infinite in the limiting case, then a process may waste time on the buffer, while another suitable processor becomes free. Conversely, if the buffer is too small, or nonexistent in the limiting case, then a process may be assigned to a suboptimal processor, simply because it was first to be free. Borrowing from quantum mechanics, preferred (i.e., more-efficient heterogeneous) characterizations can be identified in the context of others. This is good enough. Throughput will be optimized when the mean execution time equals the mean waiting time. Since these times are on average equal, it follows that each buffer should hold one process beyond that currently executing. This determination is not suitable for analysis by linear equations because not only would such a system be underdetermined, but it would be dynamically variable with the arrangement of processors and processes. Furthermore, it would not be suitable for evolutionary determination because this variable arrangement is dynamic enough to prevent convergence.

Further, the central problem arises when one takes into account that process arrival and exit determine what processors will be busy and free and so on—as recursively defined. The goal is to maximize throughput by assigning the right software process to the right hardware processor(s) at the right time(s). Of course, it can be shown that this problem is NP-hard because each assignment is a function of the previous assignments (allowing it to be mapped onto the traveling salesman problem) and they, in turn, depend upon the total number of processors, their throughput rates relative to the arriving processes, the probability that a given process can run on a given processor, the cost of contention on the bus, the cost of transporting data a given distance, as well as a few less significant factors. It is to be understood that the currently insignificant factors (e.g., assigning a process to more than one processor) can be incorporated at a subsequent point—pending only the successful demonstration of the principle herein (i.e., optimizing the solution of an NP-hard problem).

The solution to this intractable optimization problem involves the following five constituent elements: 1) software process and hardware processor distinctive features (i.e., requirements, capabilities, etc.); 2) evolution of procedural from declarative knowledge; 3) a characterization of processes and processors; 4) a capability for knowledge acquisition and generalization; and 5) a fast process execution simulation.

The first element refers to the physical primary and secondary memory, processor speed and address space, bus width (e.g., DMA), serial vs. parallel vs. distributed architecture, etc. It incorporates the requirement for the software processes to run in terms of physical hardware, speed, number of cores, and even available execution time. The second element refers to a methodology developed by the PI for acquiring procedural knowledge using a knowledge-based process. The goal of this knowledge is to guide and thereby minimize search for the best distribution for optimization. This serves to minimize search time with little, if any, degradation in the optimality of the produced optimization. Note that while knowledge does not exist for the tractable optimization of an NP-hard problem, by definition, it can be applied to get arbitrarily close to an optimal solution. The third element implies that each process and processor may have many possible characterizations. Some characterizations are better than others for optimizing the efficiency of the heterogeneous architecture. This element implies the definition of the best characterizations for processes and their assigned processors.

Further, it should be possible to define a fuzzy memory through a change of representation. Here, Shannon information theory crosses with Kolmogorov Complexity for the extraction of domain-specific generalizations (heuristics) from big data. This is a topic for further research. The defined vectors include those and only those elements, which may affect the assignment of processes to processors. The fourth element takes into account that a complete optimal mapping knowledge of process to processor is not possible. Rather, acquired knowledge can be automatically generalized and applied in lieu to approximate optimality using the methodology discussed herein. We can safely assume that the processor cost/time of running the methodology is insignificant in comparison with that of the heterogeneous architecture. For example, many programs (e.g., MP2D for the placement and routing of VLSI) take over a week to execute. The fifth element defines how to supply the evolutionary pressure. Each process logs a run time (or alternatively non-completion) every time it obtains and runs on a processor. The characterization of the executing process and processor are used to find the best available processor to assign a process to in the context of such a dynamic environment.

The approach discussed herein involves an approach to heterogeneous optimization based upon certain assumptions. Let a heterogeneous architecture be defined by i distinct processor types for a total of m processors, where $1 \leq i \leq m$. Next, each of i processor types consists of j characterizing attributes, where $1 \leq j \leq n$. A processor type is characterized by the vector, $<id, a_1, a_2, \ldots, a_n>$, where id is a unique identifier for that processor, $a_1$ is the $i^{th}$ processor type, and $a_j$ is otherwise an attribute. A processor attribute refers to the available physical primary and secondary memory, processor speed and address space, bus width (e.g., DMA), serial vs. parallel vs. distributed architecture, etc. Available attributes refer to time-shared mode, where the executing process has access to all of the inherent hardware.

Similarly, let a process be defined by h distinct process types for a total of u processes, where $1 \leq h \leq u$. Next, each of h process types consists of k characterizing attributes, where $1 \leq k \leq v$. A process type is characterized by the vector, $<id, a_1, a_2, \ldots, a_v>$, where id is a unique identifier for that process, $a_1$ is the $h^{th}$ process type, and $a_k$ is otherwise an attribute. Note that processes can differ, but be characterized by the same type in as much as they can assume different parameters, for example. It is assumed that the choice of processor type is a function of process type—not its local parametization (unless this defines a distinct process type). A process attribute refers to the required physical primary and secondary memory, processor speed and address space, bus width (e.g., DMA), serial vs. parallel vs. distributed architecture, etc. Required attributes refer to peak demands.

As used herein, a process-processor pairing is said to be conformant just in case (a) their attributes are of the same number and in the same order, which will be assumed without loss of generality (i.e., n=v), and (b) such that no $a_k$, for k, i>1, is $a_k$>$a_j$ (i.e., where the process is demanding more of an attribute than the processor has). If a process-processor pairing is non-conformant, then its runtime will be defined to be infinite. Otherwise, its runtime is given by simulation rules (no need to incur delays by awaiting trial runs executing on actual processors) and stored in a hash table (i.e., a software simulation of an associative memory). Unknown process-processor pairing runtimes are allowed to execute for a predefined max time, whereupon they are kicked out of the system.

As used herein, a preference order is dynamically defined over all process-processor pairings for each process type. A preference order may not include undefined terms. Terms are defined or updated whenever a process executes to completion on a processor. Updates may increase or decrease the expected runtime for a process-processor pairing as they apply the principle of temporal locality to a pairing—better reflecting runtimes for likely future instances of such pairings.

A dynamic list is maintained of the q processor types that are currently available (i.e., which map to an unfilled processor buffer). The value q must be large enough to get a best processor, while it must be small enough (e.g., through the use of segmentation) to enable rapid comparison as follows. For each available processor type, the execution time for the current process is retrieved from the hash table in constant time, if available. Previously unknown pairings are selected at chance (i.e., where the odds of selection are inversely proportional to current demands on the heterogeneous architectural system). A quick linear search of the result finds that available processor type, if any, which will execute that process in minimal time. A semaphore or monitor mechanism can briefly hold one processor from each of q processor types while an assignment is made. Once the processor type is selected, an actual available processor is mapped. In practice, we take q=m because O(m) is tractable at any scale (i.e., even on a single sequential processor). Heterogeneous processors may be geometrically clustered in a larger implementation. This serves to limit the size of the search (and distribution) space in trying to map them.

The simulator uses its knowledge of process-processor constraints along with experienced execution times to yield a high-speed simulation of the net effect of running different processes on allowed processors. Again, each process-processor "swap" will generally affect the dynamics of the entire heterogeneous architecture. Thus, the simulator must rapidly vary the assignments and measure the effects on the resultant throughputs. Throughput using random process-processor assignment will be compared with the simulated throughput of assignment made using the trained system. One benefit of the methodology disclosed herein is that it enables the realization of scalable heterogeneous computing architectures, which can yield performance improvements.

Given large numbers of process and processor types, the relative execution times for all possible pairings will not be known. Indeed, it may even be sparse. Even if execution times are known, they may expire over time due to changes in the usage patterns for many process types. Thus, there is an inherent need to predict symmetric execution times from the recently updated times for similar process-processor pairings.

Generally, one embodiment of the method disclosed herein uses a map to process attributes to processor attributes. For example, whenever an unknown process type arrives, one system performing the disclosed method non-deterministically maps it to a most-closely matched known process, if any. Further, whenever an unknown processor type arrives, another system performing the disclosed method non-deterministically maps it to a most-closely matched known processor. Again, processes are also randomly assigned to free processors, for which they may or may not have an execution history. This may result in an update to the execution times for the relevant process-processor pairs.

This brings us to the core problem, which pertains to how to map a context to a rule base, when the situational predicates of the rules may not be completely covered. The most-recently fired most-specific rule is selected if the rule situation is a subset of the context. The disclosed method will be detailed below and its operation will be illustrated for the application domain of processor assignment.

As mentioned above, no matter how many rules a conventional expert system has, there will always be knowledge that is not contained by its knowledge base. As a practical matter, the allowable size of a knowledge base is relatively small. Segmenting the knowledge base helps, but it can still grow to be of unmanageable size. Furthermore, if the rule base is viewed as a case base, then not all of any rules situational predicates need be covered to obtain a match. Indeed, a case represents a situation at a given time without excessive regard to the saliency of the situational predicates. Such an allowance is important because it is far easier (less costly) to specify a case than a rule. While we term our modality for knowledge capture rules, it should be clear that this modality is subsumed by cases. We call them rules to emphasize that uncorrelated predicates should never be included in any situation—that is, to the extent that this is knowable a priori.

Conventional case-based reasoning algorithms attempt a weighted match of the context against the case's stipulations. Using the disclosed methodology, the situations are minimally generalized to obtain this match. There is no way to know these weights. Rather, the appropriate task is to eliminate spurious predicates. The disclosed method does this by eliminating the minimal number of predicates to obtain a covering of at least one antecedent by the context. The results of this elimination process may yield an iterative problem for matching/fusion, which will be solved by the corrector. This process differs from conventional case-based reasoning in that a "best-matching case" may not be a single case, but rather a fusion of analogous cases. Notice that an arbitrary case may thus participate in numerous solutions. Clearly, such fusion is knowledge preserving and takes the form of a generalization. It will thus yield more accurate results by process of transformational analogy.

A problem with such fusion is that it can produce contexts of unbounded length. This is rarely acceptable in practice. Rather, a set of alternative vectors needs to be generalized to limit this length in practice. Doing so will usually include specific knowledge that was not a member of the original set. Thus, we term such generalizations heuristic knowledge. Heuristic knowledge is necessary to maintain space-time tractability. It comes at the cost of exactness in every situation. Indeed, a little heuristic knowledge can go a long way towards maintaining tractability.

For example, classic NP-hard problems, like the Traveling Salesman Problem, are readily solvable in polynomial time if the problem solution is relaxed to within just one percent of optimal. Similarly, with the proper representation (see below), generalizing just one percent of vector elements (i.e., allowing for the creation and maintenance of many categorical generalizations, rather than few, which would imply overgeneralization) (1) insures that the method disclosed herein will remain tractable and (2) allows for exponential knowledge amplification using a linear number of processors. Note that unlike deductive logics, what is necessarily lost here is certainty that bears proportion to the degree of overgeneralization. What is gained is analogical knowledge that bears validity in proportion to the degree of specialization (absence of overgeneralization). That is, just one percent of generalization can give rise to an exponential increase in the number of near-certain analogies!

As a system employing the disclosed method acquires knowledge, existing predictor and/or corrector rules may be lost. While this insures the acquisition of current knowledge, it can cause the loss of preexisting knowledge by two means. First, these preexisting rules may simply fall off of the bottom of their linked lists to free space for the new knowledge. Second, these preexisting rules may be overwritten. The net effect is that the system may forget that which was previously learned. Retraining requires only a single example unlike neural networks, which require on the order of 5,000 training examples. Furthermore that, which may be forgotten are rules that have not been recently used, are thus of relatively low utility, and are otherwise not predictable. This is very human-like and suggests that the disclosed methodology may serve as an excellent model for human learning and forgetting.

The embodiments of the method disclosed herein are based on the theory of randomness and symmetry. That is, novel knowledge is said to be random and is defined by a single rule. However, symmetric knowledge may be defined by multiple rules, which can be fused to create random knowledge. The fusion process corrects the predicted symmetric knowledge, where necessary (i.e., where the multiplicity is greater than one fired rule). This corrects it for the current context and yields relatively random knowledge. The corrector uses multiple analogies (i.e., in the form of minimal generalizations) to correct the predictor and itself. This arrangement allows for more knowledge to be acquired than a single rule acquisition would otherwise provide. This follows because each rule acquisition represents relatively random knowledge and thus contributes to the candidate pool of multiple analogs that may be derived from it.

A predictor-corrector methodology is desirable because it can fuse multiple analogs to create novel knowledge, which while having analogical derivations, qualifies as being relatively random. This methodology evidences a duality—that is, where symmetric and random knowledge necessarily become inseparable definitions. Furthermore, the corrector base is a mathematical fixed point. This is because multiple analogies can iteratively map to multiple analogies before converging on a random point of knowledge. We have previously seen this possibility in theory, but have never been able to realize it in practice. For example, two programs are said to be analogous if there exists a recursively enumerable transforming program, which maps one to the other such that the transforming program is "smaller" than both the pre-image and image programs. But, as the transforming program gets larger, the distinction between a symmetric and a random map begins to blur. The aforementioned duality accounts for that blur; and, it is practically achievable.

It should also be noted that the generalizations are not arbitrary. They are constrained to minimally generalize a situation so as to allow coverage by a context. This constraint is sufficient to define an analog. Then, the principle of duality allows for the fusion of multiple analogs to increase the validity of the non-generalized result. Learning serves to cache experiences for real-time replay as well as validate future possibility metrics. In this case, that learned knowledge is amplified by all of the implied and fused analogs to it at run time. As a result, this method can come up with seemingly random knowledge having relatively high probabilities of validity.

Further, the generalization, or equivalently analogical creation, process is data driven by the supplied context. Thus, the level of creativity needed is determined by previously acquired knowledge and the current problematic need.

One example of an algorithm that may be used to implement the embodiments of the method disclosed herein is as follows.

Begin

1. Strictly numeric predictor antecedents may have their consequents defined as a mathematical function of the associated antecedents (e.g., min, max, mean, median, etc.), as appropriate. This eliminates the role of a corrector rule base, which is needed for qualitative transformation. It is also possible to incorporate fuzzy numeric matching and/or fuzzy qualitative matching (see L2).
2. Rules are expunged from the logical tail to free space and rules that participate in the computation of a proper action(s) are moved to the logical head. This applies to the predictor as well as the corrector rule bases.
3. Non-deterministic consequents are matched using the OR function, since one may substitute for another.
4. Acquire a predictor context and search the predictor base for all situations covered by it. The inference engine may match well-defined property lists for qualitatively fuzzy matches (i.e., creative computing).
5. If exactly one predictor rule is found and proves to be incorrect, the predictor base is empty, or an interrupt is received (due to temporal constraints), acquire a new predictor rule at the logical head, or overwrite its consequent if the situation has an exact match, where the predictor context serves as the antecedent and the correct response serves as the consequent, if known. Go to L1 with the (set of non-deterministic) consequent(s). Note that non-deterministic consequents may be selected at random or jointly produced, as appropriate. Better still, one or more non-deterministic consequents may be generalized by L2 so as to match more than one antecedent. Here, the first free non-deterministic processor, which is an instance of a generalized non-deterministic consequent is selected.
6. If more than one predictor rule is found, create a corrector context from the union/generalization of the fired (non-deterministic) consequents. For strictly deterministic consequents, this context will take the form, {a, b, . . . }, while for strictly non-deterministic consequents, this will take the form, {{a, b, . . . }, {c, d, . . . }, . . . }, where the inner sets represent non-deterministic alternatives. Generalizations are computed with words and may change the representation for these sets. For example, [70, 80]° F. might be ascribed the generalization, warm. Two or more intervals may overlap. Thus, [65, 75]° F. might be ascribed the generalization, temperate. Thus, 72° F. is warm and temperate. The allowance for overlapping intervals increases the possibility for a matched instance without the undue loss of information to generalization. Overlapping intervals themselves are subject to a generalization of representation.

7. Here, we create a least-generalized predictor antecedent(s), which is covered by the predictor context. To do this, for each predictor antecedent, create the set, antecedent—context. Find the number of terms in the minimal resultant(s). These are the terms, which minimally must be deleted from that antecedent to enable the predictor context to fire it. Should this process give rise to more than one distinct minimal resultant set, the antecedent-induced minimal resultant representing the most-recently acquired/fired rule is selected. These are the most-specific rules.

Repeat

8. Create a corrector context, if necessary, by taking the union/generalization of all minimally-generalized associated antecedents and fired (non-deterministic) appropriate consequents. Again, for strictly deterministic consequents, this antecedent will take the form, {a, b, ... }, while for strictly non-deterministic consequents, this will take the form, {{a, b, ... }, {c, d, ... }, ... }, where the inner sets represent non-deterministic alternatives. Again, generalizations are computed with words and may change the representation for these sets. For example, greater than 8 GB of RAM might be described by the generalization, "high". There is also an allowance for overlapping intervals to increase the possibility for a matched instance without the undue loss of information to generalization.

9. Search the corrector base for all situations covered by the corrector context. The inference engine may match well-defined property lists for qualitatively fuzzy matches (i.e., creative computing). This step is complete if least-generalized corrector antecedent(s) have been created.

10. If exactly one corrector rule is found and proves to be incorrect, the corrector base is empty, or an interrupt is received (due to temporal constraints), acquire a new corrector rule at the logical head, or overwrite its consequent if the situation has an exact match, where the generalized corrector context serves as the antecedent and the correct response serves as the consequent, if known. Go to L1 with the (set of non-deterministic)/generalized consequent(s). Note that non-deterministic consequents may be selected amongst at random or jointly produced, as appropriate. Again, one or more (i.e., up to some fixed number) non-deterministic consequents may be generalized so as to match more than one antecedent. Here, the first free non-deterministic processor, which is an instance of a generalized non-deterministic consequent is selected.

11. If more than one corrector rule is found, create a corrector context from the union/generalization of the fired (non-deterministic) consequents. For strictly deterministic consequents, this context will take the form, {a, b, ... }, while for strictly non-deterministic consequents, this will take the form, {{a, b, ... }, {c, d, ... }, ... }, where the inner sets represent non-deterministic alternatives. Again, generalizations are computed with words and may change the representation for these sets. For example, greater than 550 watts might be described by the generalization, "e-inefficient". There is also an allowance for overlapping intervals to increase the possibility for a matched instance without the undue loss of information to generalization.

12. Here, we create a least-generalized corrector antecedent(s), which is covered by the corrector context. To do this, for each corrector antecedent, create the set, antecedent—context. Find the number of terms in the minimal resultant(s). These are the terms, which minimally must be deleted from that antecedent to enable the corrector context to fire it. Should this process give rise to more than one distinct minimal resultant set, the antecedent-induced minimal resultant representing the most-recently acquired/fired rule is selected. These are the most-specific rules.

13. If an interrupt is received while creating a corrector rule, acquire a new corrector rule at the logical head, or overwrite its consequent if the situation has an exact match, where the current context serves as the antecedent and the correct response serves as the consequent, if known. (If not known, exit.)

Until forever;

14. L1: (Only exit when a single predictor/corrector/generalization rule is fired per iteration, or a correct consequent cannot be had.) Each fired action is associated with a possibility metric. This metric is inversely proportional to the maximum percentage of deleted antecedent predicates produced in matching any single rule in the predictor and corrector bases. It is only 100 percent for newly acquired rules. The acquisition of correct rules having less than a 99 percent possibility metric not only serves to cache them, but to validate their future possibility metrics as well. The fusion of non-deterministic consequents does not enter into the possibility computation. Here, it is assumed that enough categories for generalization are created so that in the context of each other (e.g., a vector) any resultant loss of validity is deemed to be insignificant for the problem class. A more accurate error estimate may sometimes be obtained (especially using pure computing with words) by evolving a history function for each rules error as a function of the number of deleted and generalized predicates. Nevertheless, as NP-hard problems scale, it becomes totally impractical to know the optimal result; hence, the error estimate is by definition inherently an estimate (scalable quantum computers not withstanding). A metaphorical explanation subsystem traces all system actions to the iterative fusion (and generalization of predicates as well as of representation) for analogous rule outputs in the predictor and corrector rule bases.

15. L2: Here, parallel processor(s) are used to find non-deterministic randomizations (generalizations) for pairs of most-recently fired corrector rules. Each corrector rule is comprised of {corrector antecedent}→{corrector consequent}. All terms in each rule must be in common except for one pairing. That pairing may lie in the antecedents or the consequents, but not both. Randomization occurs where a generalization is already known or discovered by query (to a knowledge base for speed, or a human if novel), which allows the pairing of distinct terms to be equated (e.g., {apple, orange}→{fruit}). Subsumption is allowed (e.g., {fruit, pear}→{fruit}). Each successful randomization is iteratively followed by a search for further randomization using the randomized rule and a probabilistically selected one. The 3-2-1 Skew is used to make the probabilistic selection. It is also used to select the initial candidate pairing of rules to be tested for randomization. Basically, rules at the logical head of the generalization base are more likely to be selected. They are acquired at the head of this base and moved there whenever successfully applied. Thus, generalization rules, which do not find application fall to the logical bottom of this base from which memory may be reclaimed (i.e., tail deletion, where they are forgotten).

Randomizations then bear proportion to use. Tractability (i.e., linear instead of quadratic complexity) follows from this selecting rules on the basis of their utility. The choice of symbolic descriptors for interval ranges or set members plays a crucial role in enabling randomization through this process. In addition to a logical copy of the ordered corrector rules, the Generalizer holds all defining randomizations (e.g., {apple, orange}→{fruit}). They are all treated as equals in the assignment of the 3-2-1 Skew. Of course, simple vector generalization need not be taken to the theoretical extreme of randomization (e.g., in heterogeneous optimization). The utility of the theoretical extreme follows from scale and not all domains qualify. End.

Weather Prediction Application

We supply a small predictor rule base consisting of ten rules. This knowledge base was derived from the National Wildlife Federation website.

P1: Wind from West^Barometric Pressure Rising Slowly→Fair Weather
P2: Cumulous Clouds^Fog Burned Off by Noon→Fair Weather
P3: Barometric Pressure Falls^Temperature Warm→Rain
P4: Barometric Pressure Falls^Temperature Freezing→Snow
P5: Cumulous Clouds Develop Columns^Halo Around the Moon^Cloud Ceiling Lowers→{Rain, Snow}
P6: Sky Darkens^South Wind Increases in Velocity^Wind Shifts in a Counterclockwise Direction→{Rain, Snow}
P7: Barometric Pressure Rising Quickly→Clear
P8: South Winds Shift to West^Cloud Ceiling Lifts→Clear
P9: Night is Clear^No Cloud Cover^No Wind→Cold Temperatures
P10: Barometric Pressure Rises in Winter→Cold Temperatures To illustrate the application of the steps of the previous algorithm, we enclose the exercised steps in parentheses. Let the initial predictor context be, {Wind from West, Barometric Pressure Rising Slowly, Cumulous Clouds}. We find that P1 is covered by the predictor context (Step 4). This takes us to (Step 14). This single predictor rule is fired and it is not moved, since it is already at the logical head (Step 2). A proper prediction is issued for Fair Weather. No antecedent predicates needed to be deleted to fire this single predictor rule. Thus, the possibility metric is inversely proportional to 0 percent, which we take as a 99 percent possibility (Step 14). This literal rule firing is the explanation (Step 14). This concludes the first firing cycle, where recourse was only made to the predictor knowledge base. Next, the use of the corrector base will be illustrated.

Next, let the predictor context be {Barometric Pressure Falls}. No situation in the predictor base is covered by this context (Step 4). Thus, we create least-generalized predictor antecedents, which are covered by the predictor context (Step 7). We create the sets, antecedent—{Barometric Pressure Falls} for all ten predictor antecedents. In particular, we have the following results.

P3: {Barometric Pressure Falls, Temperature Warm}–{Barometric Pressure Falls}={Temperature Warm}
P4: {Barometric Pressure Falls, Temperature Freezing}–{Barometric Pressure Falls}={Temperature Freezing}

These are minimal resultants and each has one term. These terms are deleted from the antecedents in P3 and P4, respectively. The predictor context can now fire each of these rules. They are then moved up to the logical head of the predictor base (Step 2).

This leads to the generation of the corrector context, {Rain, Snow} (Step 8). The corrector base is empty (Step 9) (Step 10). Thus, the corrector base is initialized with the following rule. Note that the consequent here need not ask a question; it may instead provide declarative knowledge and in either case a predicate interpreter may be integrated into the intelligent shell (e.g., a cloned intelligent system).
C1: {Rain, Snow}→{Is the temperature warm or freezing?}

Fifty percent of the antecedent predicates were deleted in matching P3 and P4 (Step 14). Let us start with the same predictor context (Step 4), {Barometric Pressure Falls} to generate the same corrector context, {Rain, Snow} (Step 8). This will lead to firing C1 (already at the logical head) (Step 9) (Step 10) (Step 14). The possibility metric is inversely proportional to 50 percent, or 50 percent (i.e., 1.0−0.5=0.5) (Step 14). The produced metaphorical explanation is that, "In order to fire P3 or P4 (and predict Rain or Snow) with the predictor context {Barometric Pressure Falls}, one must also know, "Is the temperature warm or freezing?" (Step 14). Acquiring either will augment the context for an exact match of P3 or P4 (Step 5) and produce a proper prediction of Rain or Snow with a 99 percent possibility and a literal explanation using P3 or P4, as appropriate (Step 14).

Next, let us see how non-determinism is handled by the algorithm. Suppose that P4 is augmented by experiential learning to become:
P4': Barometric Pressure Falls^Temperature Freezing→Snow v Sleet Let the predictor context be {Barometric Pressure Falls} as before. This leads to the generation of the corrector context, {Rain, {Sleet, Snow} } (Step 8). Notice that the corrector antecedent C1 is covered by this context (Step 9) (Step 10) and once again the proper information to augment the predictor context is elicited (Step 14). If it is learned that the temperature is freezing, then Sleet, Snow, or both may be forecast in view of the non-determinism (Step 5). If the temperature is freezing, then a prediction of Sleet or Snow with a 99 percent possibility and a literal explanation using P4' will be produced (Step 14).

Next, let us see how the powerful concept of an iterative fixed point corrector base works. Suppose, in time, the corrector base appears as follows. Note that C1 and C2 are non-deterministic corrector rules, which are realized using separate rules. They may have been equivalently realized using a single rule, as previously demonstrated.
C1: {Rain, Snow}→{Cumulous Clouds Develop Columns, Halo Around the Moon, Cloud Ceiling Lowers}
C2: {Rain, Snow}→{Sky Darkens, South Wind Increases in Velocity, Wind Shifts in a Counterclockwise Direction}
C3: {Cloud Ceiling Lowers, Sky Darkens}→{Temperature Freezing, Temperature Warm}

Let us start with the same predictor context (Step 4), {Barometric Pressure Falls} to generate the same corrector context, {Rain, Snow} (Step 8). The situations for C1 and C2 are covered by this context (Step 9). The new corrector context is thus, {Cloud Ceiling Lowers, Cumulous Clouds Develop Columns, Halo Around the Moon, Sky Darkens, South Wind Increases in Velocity, Wind Shifts in a Counterclockwise Direction} (Step 11). Next, we create a least-generalized corrector antecedent, which is covered by this context (Step 12). We find that no terms need be deleted to obtain a covering of C3. This covers steps (Step 8) and (Step 9). C3 produces the correct interpreted consequent to augment the predictive context (Step 14). Acquiring either will augment the context for an exact match of P3 or P4 (Step 5) and produce a proper prediction of Rain or Snow with a 99 percent possibility, a metaphorical explanation using C1 and C2 to fire C3, and a literal explanation using P3 or P4 as appropriate (Step 14). Note that search may be interrupted in the predictor base and after an arbitrary number of iterations in the corrector base if an interrupt is received (due to temporal constraints). In either case, providing a proper consequent insures immediate replay on the next iteration, where the only possible memory loss is a tail loss due to spatial constraints.

Processor Assignment Application

We supply a small predictor rule base consisting of four rules. This knowledge base will be used to map unknown processes to known processes and thus to the best of their associated processors. This (initial) non-deterministic list of best associated processors need only include those processors having acceptable runtimes, where the best runtimes are leftmost. A similar knowledge base for mapping unknown and/or multiple processors to known processors defines the corrector. For example, <1, 1, 1, 100, 1, 4> refers to a process having a unique id of 1, of type 1, requiring 1 GB of primary and 100 GB of secondary memory, suggested for execution on a minimal 1 GHz processor, consisting of 4 cores (see P1 below). Similarly, <2, 3, 1, 2, 2, 8, 300> refers to a processor having a unique id of 2, of type 3 (not to be confused with a process id or type), having 1 GB of primary and 2 GB of secondary memory, a 2 GHz processor, 8 cores, and drawing 300 watts (an operational cost factor)—(see P1 below). Predictor rule, P1, below, shows that process id #1 may be run on two processors having ids of 2 and 1, respectively. The former will execute it at least as fast, if not faster, and is to be preferred should both processors become simultaneously available (i.e., have empty buffers). This is because, in this study, of an NP-hard process, we are optimizing for speed (not power consumption per unit of time—even if the total watt hours may thus be minimized).

Legend: Process <id, type, primary GB, secondary GB, min GHz processor, # cores>→Processor <id, type, primary GB, secondary GB, GHz processor, # cores, # watts>| . . .

P1: <1, 1, 1, 100, 1, 4>→<2, 3, 1, 2, 2, 8, 300>|<1, 3, 1, 1, 1, 4, 200>

P2: <2, 2, 4, 200, 2, 8>→<3, 4, 8, 500, 4, 8, 500>|<4, 4, 4, 300, 4, 8, 300>

P3: <3, 3, 8, 200, 2, 8>→<5, 4, 16, 1000, 8, 8, 600>|<6, 4, 8, 500, 6, 4, 550>

P4: <3, 3, 8, 400, 4, 8>→<7, 5, 16, 1000, 12, 16, 1000>

To illustrate the application of the 14 steps of the embodiment of the disclosed method described above, the exercised steps are enclosed in parentheses. Let the initial predictor context be, <*, 1, 1, 100, 1, 4>. We find that P1 is covered by the predictor context (Step 4). This takes us to (Step 14). This single predictor rule is fired and it is not moved, since it is already at the logical head (Step 2). A proper prediction is issued for processor <*, 3, 1, 2, 2, 8, 300> if available, or processor <*, 3, 1, 1, 1, 4, 200> if available (and otherwise iterating until the first of these two becomes available). No antecedent predicates needed to be generalized to fire this single predictor rule. Thus, the possibility metric is inversely proportional to 0 percent, which we take as a 99 percent possibility (14). This literal rule firing is the explanation (14). Also, an allowance for up to two non-deterministic consequents here implies no need (yet) to generalize any vector elements with words. This concludes the first firing cycle, where recourse was only made to the predictor knowledge base. Next, the use of the corrector base will be illustrated.

Let the predictor context be given by <7, 2, 8, 100, 5, 1>. No situation in the predictor base is covered by this context (Step 4). This is because the process requires at least 8 GB of primary memory (leaving P3 and P4 as the only candidates) and a 5 GHz or faster processor (eliminating P3 and P4). Thus, we create least-generalized predictor antecedents, which are covered by the predictor context (Step 7). We create the sets, antecedent—<7, 2, 8, 100, 5, 1> for all predictor antecedents. In particular, we have the following results (prior to generalizing any vector elements with words).

P3: <3, 3, 8, 200, 2, 8>-<7, 2, 8, 100, 5, 1>=<*, *, 8, -, -, ->, where "*" designates a don't care and "-" designates a generalized term.

P4: <3, 3, 8, 400, 4, 8>-<7, 2, 8, 100, 5, 1>=<*, *, 8, -, -, ->

Note that we don't attempt to form ranges (e.g., secondary memory between 100 and 400 GB in P4) because this cannot be validated due to the associated context (e.g., between a 4 and a 5 GHz processor and between 1 and 8 cores in P4). These are minimal resultants and each has one term; namely, 8 GB of required primary memory. The "*" and "-" are ignored in the antecedents in P3 and P4, respectively. The predictor context can now fire each of these rules. They are then moved up to the logical head of the predictor base (Step 2).

This leads to the generation of the corrector context, {{<5, 4, 16, 1000, 8, 8, 600>|<6, 4, 8, 500, 6, 4, 550>}, <7, 5, 16, 1000, 12, 16, 1000>} (Step 8). The corrector base is empty (Step 9) (Step 10). Thus, the corrector base is initialized with the following rule. Note that the consequent here need not provide declarative knowledge; it may instead ask a question and in either case a predicate interpreter may be integrated into the intelligent shell (e.g., a cloned intelligent system).

C1: {{<5, 4, 16, 1000, 8, 8, 600>|<6, 4, 8, 500, 6, 4, 550>}, <7, 5, 16, 1000, 12, 16, 1000>}→<max+1, 2, 8, 100, 6, 1, 550>|<max+1, 1, 16, 200, 8, 4, 750>, where max+1 is a sequential processor id number. Observe that a processor of type 2 is best, followed by a processor of type 1, as defined above. The selected best processors are based upon empirical knowledge to date. The C1 mapping rule is based upon the association between generalized contextual firing consequents and this empirical knowledge. Notice the role of the corrector in mapping the characterized processors to ordered literal processors. The vectors used here are also subject to a generalization of representation.

Thus, 75 percent of the antecedent predicates (i.e., "-"s) were deleted in matching P3 and P4 (Step 14). Let us start with the same predictor context (Step 4), <7, 2, 8, 100, 5, 1> to generate the same corrector context, {{<5, 4, 16, 1000, 8, 8, 600>|<6, 4, 8, 500, 6, 4, 550>}, <7, 5, 16, 1000, 12, 16, 1000>} (Step 8). This will lead to firing C1 (already at the logical head) (Step 9) (Step 10) (Step 14). The possibility metric is inversely proportional to 75 percent, or 25 percent (i.e., 1.0−0.75=0.25) (Step 14). The produced metaphorical explanation is that, "In order to fire P3 or P4 using the predictor context <7, 2, 8, 100, 5, 1>, and obtain the non-generalized processor ordering, <max+1, 2, 8, 100, 6, 1, 550>|<max+1, 1, 16, 200, 8, 4, 750> using the corrector C1, one must first find the minimally generalized predictor antecedents (Step 7). The predictor and corrector work together to cover exponentially more situations than acquiring a predictor rule in lieu of a corrector rule could. This exponential capability explosion is formally proven next. Then, an example of the vector generalization capability, needed to support it, will be offered.

Theoretical Analysis

If the number of non-deterministic vectors output by a system employing the disclosed method, where the number of corrector action classes<<the number of corrector rules (characterizing a symmetric domain), is k-limited through the careful (i.e., context-sensitive) generalization of knowledge representation, there may be an exponential growth in the number of correct action responses (i.e., exponential knowledge amplification) and only a linear growth in the number of incorrect action responses. Thus, the allowance for heuristic knowledge enables the exponential amplification of knowledge in a symmetric domain in practice (i.e., with corrective feedback to the corrector base).

A random domain may be defined to be one where the number of corrector rules approximates (or is smaller than) the number of corrector action classes. Conversely, define a symmetric domain to be one where the number of corrector rules>>the number of corrector action classes. Consider the corner points:

Case 1 (maximally symmetric): The number of corrector action classes is two. Here, the probability of assigning the correct consequent to an unknown antecedent is 50 percent (assuming a uniform bilateral distribution).

Case 2 (random): The number of corrector action classes equals the number of corrector rules (c). Here, the probability of assigning the correct consequent to an unknown antecedent is 1/c, which approaches zero as c increases without bound.

Since the number of corrector action classes may increase uniformly between cases 1 and 2, it follows that the initial probability of a correct generalization is (0, 50]%.

Next, the number of rules in the corrector base is only limited by the number of possible distinct corrector antecedents. Define a minimally symmetric domain to consist of c/2 corrector action classes. Thus, the maximal size for any concatenated corrector context or antecedent will be nd*c/2, where nd is the mean length of a non-deterministic corrector consequent. If k=nd*c/2, generalization of representation is not required, there is no error creep, and the maximal spatial requirements are $O(c^2)$. The latter follows because each corrector antecedent can be comprised of a non-redundant concatenation of up to c/2 corrector consequents (to maintain a minimum of two corrector action classes).

However, without loss of generality, suppose that k=1. This is the case where maximal generalization occurs. Then, on average, up to c/2 corrector consequents are randomized into whatever representation for generalization is employed. That generalization is not necessarily unique. Furthermore, let the degree (deg) of generalization be defined for each non-deterministic alternative for each term, on average, be defined by a diameter. Thus, for example, if a corrector consequent were literally, {apple} and its generalization were {fruit} the diameter of fruit would be defined by the number of fruits (e.g., 100). Here, the degree of generalization for that term would be 100. Similarly, if a corrector consequent were literally, [0, 10] and its generalization were [0, 100] the diameter of its generalization would be defined by |0-100|/|0-10|=10. Hence, the degree of generalization for that interval would be 10.

Recall that corrector consequents may be fed back to the corrector base as generalized corrector antecedents (see FIG. 1). Such generalization multiplies the space of covered candidate corrector antecedents, on average, by $nd\Pi_{i=1}^{p} deg_i$, where p is the mean number of terms in a corrector antecedent (terms are not pruned here to obtain a match with the corrector context). Notice that while c may be very large, $nd\Pi_{i=1}^{p} deg_i >> c$. This means that in practice, the number of conditions for which knowledge is sought is almost always exponentially larger than the basis knowledge, which is stored. This candidate knowledge space is $O(deg^p)$ and requires exponential knowledge amplification to cover it.

However, such amplification is fuzzy and thus necessarily increases the chance of including erroneous knowledge due to overgeneralization. We have allowed an error creep in order to obtain such amplification. However, the amount of such error creep must be analyzed, in a domain-independent manner, for the exponential amplification to be of value in more or less domains.

Objects or ranges, which share common properties, define domain-specific wells. These wells are defined in the context of other wells, which comprise a corrector antecedent. For example, the properties {grows-on-trees, high-in-water, tastes-sweet, et al.} define a well for the generalization of an apple in the context of edible foods. Not all properties need be or can be enumerated for a well. It suffices that a sufficient number of properties be enumerated to categorize the generalization and its instances. Thus, we have:

P5: If an {apple} and {edible} then {eat} and its generalization:

P6: If a {fruit} and {edible} then {eat}

Notice that other properties of an apple would be applicable in other contexts and might preclude this generalization. For example:

P7: if an {apple} and {canning} then {make apple sauce}

Similarly, ranges may be generalized to enlarge their scope or be replaced by symbols. In either case, domain-specific context is the determining factor. For example, while [20, 30]° C. might generalize to warm for you and I, it might generalize to hot in the context of an Eskimo.

Clearly, generalizations and generalization languages are domain-specific. They must evolve for each independent domain to minimize the error creep. The context can invalidate a generalization. The increase in errors here can be additive with the degree for each term in a corrector antecedent. The reason that it need not be multiplicative is that if the generalizations are properly conceived, given any set of term instances, it will be the number of possible values (i.e., diameters) for each instance minus one for each term (i.e., the known correct combination of term values in a known antecedent), which defines the error creep associated with optimal knowledge amplification in an arbitrary domain.

However, if the generalizations are ill conceived (e.g., allowing for excessive diameters in the context of other antecedent terms), then the error creep will be multiplicative. They can also be too specific (i.e., not allowing for sufficient diameters), in which case the error creep will be sub-linear and tend towards zero. There can be no domain-general way to place an upper bound on the diameters for term generalizations associated with optimal amplification (minimizing the error ratio in an arbitrary domain). This follows from the recursive unsolvability of the equivalence problem, which tells us that it is undecidable if two arbitrary programs compute the same function.

It follows that it is undecidable if a term generalization is equivalent to a program, which computes an error for an arbitrary context. Thus, even the use of our "incremental pairing generalization method" cannot fully account for the context of the other terms. Rather, these generalizations must evolve through the corrector rule acquisition and deletion process, which critically depends on domain-specific corrector feedback (see FIG. 1). Unlike the case for deduction, inductive knowledge acquisition, in an arbitrary domain, cannot be effectively separated from the recognition and pruning of erroneous knowledge. The randomization of arbitrary knowledge is virtually unbounded and inherently takes time. Error is inherent to such evolution. To illustrate these results, consider the temperature at which people prefer to consume an apple:

P8: If {apple} and temperature [20] ° C. then {consume}
A generalization might be:
P9: If {fruit} and temperature [10, 30] ° C. then {consume}
The space of possible distinct antecedents here is 100 fruits×20 discrete temperatures=2,000. However, the rate of error increase is far less. Assuming that the generalizations are proper for this domain, there are 99 fruits and 19 temperature combinations for each that are unknown. But, the approximate error increase is only 99+19=118 out of 2,000 rules (or 6 percent). Again, this follows because the generalizations used are specific to the context. Thus, the mean error associated with exponential knowledge amplification is given by $\Sigma_{i=1}^{P} \deg_i / \Pi_{i=1}^{P} \deg_i$. This candidate error space is O(p*deg), where p is the mean number of terms in a corrector antecedent.

The question arises as to how the symbols, along with their ranges, may be learned for the generalization of representations. The answer is to develop systems for their generalization. A collection of systems using the disclosed method then comprises a system of systems. Consider the following corollary that non-deterministic generalization rules can be learned for application to predictor and/or corrector antecedents and/or consequents.

The proof of this corollary is by way of example. Semantic information compression was unsuccessfully attempted by Minsky and Bar-Hillel using logics. However, neither Boolean nor fuzzy logics suffice and a Computing with Words approach is needed.

Consider a system employing the disclosed method, whose predictor base initially contains two rules. We're going to be talking apples and oranges here:

P10: {hungry, food}→maps to {eat, apple}
P11: {hungry, drink}→maps to {eat, orange}
Moreover, let the initial context be {hungry}. This is too general to cover an antecedent of P10 or P11. Here, a minimal of one element is deleted from each. This leaves the antecedent {hungry}, which is covered by the context. As many as half of the elements had to be deleted to obtain this match. Thus, the possibility here is the inverse of this, or 50 percent. Now, a non-deterministic consequent is obtained:
P12: {hungry}→maps to {eat, apple}|{eat, orange}

Further suppose that the allowance is for a single set. Then, the consequent is in need of a generalization of representation. Rather than predefine this generalization, let's see how a system using the disclosed method might acquire this knowledge. Prior to such acquisition, the choice between the two consequent sets may be made at chance. However, suppose that the following pair of rules were already part of the predictor base.
P13: {grow, apple}→maps to {trees}
P14: {grow, orange}→maps to {trees}
This represents that both apples and oranges grow on trees. The disclosed method continually searches for ways to randomize the predictor and corrector rule sets. Rule pairs may be tested using a 3-2-1 Skew, which tests for randomization in proportion to the time of acquisition or most-recent use. Here, P13 and P14 can be randomized just in case a symbolic descriptor generalizing apples and oranges can be had. This generalization may already exist in the "Generalizer", or a query may be issued to a human and/or another Generalizer, which can yield the generalization:
P15: {apple, orange}→generalizes to {fruit}
Next, this generalization is applied to P12 to yield:
P12': {hungry}→maps to {eat, fruit}

If this is not a satisfactory response, {eat, fruit} will serve as a generalized corrector context. Then, iterative mapping and generalization in the corrector base will be the same as was just completed for a single iteration in the predictor base. For example, suppose that we had a non-deterministic generalization for {apple, orange}; namely,
P16: {apple, orange}→generalizes to {round-things}
Note that the context of P13 and P14 cannot be used to direct the generalization because both fruits and round things (e.g., coconuts) grow on trees. Rather, a non-deterministic search for the proper generalization(s) needs to be conducted, where feedback is provided by the corrector base. Here, we need to correct, {eat, round-things}.
Suppose the corrector base contains the following pair of rules.
C2: {food, round-things}→maps to {fruit}
C3: {throw, round-things}→maps to {play, catch}
The corrector context, {eat, round-things} does not cover C2 or C3. Here, a minimal of one element is deleted from each. This leaves the antecedent {round-things}, which is covered by the context. As many as half of the elements had to be deleted to obtain this match. Thus, the possibility here is the inverse of this, or 50 percent. This is not less than before so the overall possibility remains unchanged. Now, a non-deterministic consequent is obtained:
C4: {round-things}→maps to {fruit}|{play, catch}
Again, suppose that the allowance is for a single set. Then, the consequent is in need of a generalization of representation. Prior to this, the correct alternative, {fruit} might be selected at chance from among the non-deterministic alternatives. No generalization for {fruit}|{play, catch} exists in the "Generalizer", nor does any query return one. This can only mean that a corrector rule needs to be acquired for the original context as follows.
C5: {eat, round-things}→maps to {fruit}
This triggers the formation of a generalization with C2:
C6: {food, eat}→generalizes to {eat}
where {eat} is taken from the supplied context. Indeed, when we were kids, we used to say, "Give me eat", proper grammar notwithstanding. If the next context were, {food, round-things}, assuming that C2 was lost at the tail, in the first iteration of the corrector it would be generalized to {eat, round-things} (C6); then, in the second and last iteration of the corrector this resultant would be mapped to {fruit} (C5), as desired. Incidentally, the evidenced capability to synthesize symmetric knowledge is a hallmark of intelligence.

Next, let us see how the powerful concept of an iterative generalized fixed point corrector base works. Suppose, in time, the corrector base acquires C7 as follows.
C7: <max+1, 2, 8, 100, 6, 1, 550>|<max+1, 1, 16, 200, 8, 4, 750>→<max+1, 1, 8, 200, 6, 1, 450>
Suppose now that the allowance is reduced to a single vector. We will generalize the representation of the vectors themselves (not to be confused with generalizing the number of elements in a vector to obtain a match for a context) to achieve this randomization. Let,
id, type: immutable
primary GB: low (less than 8); medium (8); high (greater than 8)

old (less than 4); current (more than 4, less than 12); future (more than 12) secondary GB: low (less than 500); medium (500); high (greater than 500)

old (less than 250); current (more than 249, less than 750); future (more than 749) GHz processor: slow (less than 5); regular (5-7); fast (greater than 7)

cores: few (1, 2); average (4); high (at least 8)

watts: e-efficient (less than 400); average (400-550); e-inefficient (greater than 550)

Notice that the symbolic descriptors for primary and secondary memory each contain a pair (there could be more) of overlapping descriptors. Again, this increases the possibility for a matched instance without the undue loss of information to representational generalization. Each descriptor carries salient details. Overlapping intervals are also subject to a generalization of representation. For example, (low, old) below could be replaced by the generalization, "primitive".

Other descriptor vectors could be similarly replaced, but are not shown to improve readability. In the general case, such reductions define a context-free grammar for the randomization of representation. Their acquisition is the subject of grammatical inference. Notice that highest-level, or phrase-structure grammatical inference (i.e., Type 0) is then defined by the method itself, since even simple production systems are universal (see FIG. 1). This is two orders of magnitude more general/capable than the Type 2 grammatical inference proposed by Solomonoff upon which it builds. Solomonoff proved that grammatical inference more general than is required for regular grammars (i.e., Type 3) must be heuristically based. Now, we have the result that grammatical inference more general than is required for context-free grammars (i.e., Type 2) must be based on context-free grammatical inference. This is equivalent to a two-level or w-grammar, which is known for the realization of Type 0 generality—only here we provide, for the first time, an operational mechanics.

Substituting these symbolic representations into the corrector rule, C7, yields these general representations:

C7': <max+1, 2, (medium, current), (low, old), regular, few, average>|<max+1, 1, (high, future), (low, old), fast, average, e-inefficient>→<max+1, 1, (medium, current), primitive, regular, few, average>

Next, we fuse the antecedent for C7', since the allowance has been reduced to a single vector:

C7": <max+1, (1, 2), (medium-high, current-future), primitive, regular-fast, few-average, average-e-inefficient>→<max+1, 1, (medium, current), primitive, regular, few, average>

Let us start with the same predictor context (Step 4), <7, 2, 8, 100, 5, 1> to generate the same corrector context, {{<5, 4, 16, 1000, 8, 8, 600>|<6, 4, 8, 500, 6, 4, 550>}, <7, 5, 16, 1000, 12, 16, 1000>} (Step 8). The situation for C1 is covered by this context (Step 9). Suppose that no processors of the mapped types are available (after suitable delay). Then, the new corrector context is thus these mapped types, <max+1, 2, 8, 100, 6, 1, 550>|<max+1, 1, 16, 200, 8, 4, 750> (Step 11). If the allowance here is but a single vector, then the representation of this context is reduced to:

<max+1, (1, 2), (medium-high, current-future), primitive, regular-fast, few-average, average-e-inefficient>

Next, we create a least-generalized corrector antecedent, which is covered by this context (Step 12). We find that no terms need be deleted to obtain a covering of C7". This covers steps (Step 8) and (Step 9). C7" produces the correct interpreted generalized consequent to map the predictive context (Step 14). If this generalized consequent maps a processor, which is not among the available processors, allowing for a suitable delay constant for recycle time, the generalized consequent may be fed back into the corrector base. This possibly yields new covered corrector antecedents for consideration (i.e., minimally generalizing them as necessary (Step 12)). These new covered antecedents, if any, are covered by a more general context than in previous iterations. This serves to extend the extent of employed analogy in the search for the first available suitable processor (i.e., iteratively more general heuristic search). A cumulative possibility metric is taken as the minimum of all produced possibilities. A metaphorical explanation using C1 (it will also have a generalized representation) to fire C7" will be produced (Step 14).

Note that search may be interrupted in the predictor base and after an arbitrary number of iterations in the corrector base if an interrupt is received (due to temporal constraints). In either case, providing a proper consequent insures immediate replay on the next iteration, where the only possible memory loss is a tail loss due to spatial constraints.

A proper generalization is defined as one where the property list of the instance–the property list of the generalization=NIL. Moreover, if the prop (generalization)–prop (instance)=NIL too, then the instance and the generalization are synonyms. It follows that sufficiently defined relative property lists may substitute for their defining predicates in the inference engine. Moreover, two or more contextual predicates may be jointly generalized, using the ∩ operation, to yield the inherent (randomized) context-sensitive context, which is a minimal form for any given time (e.g., {fruits} for {apples, oranges}). It increases the likelihood of finding candidate generalizations by increasing the number of rules, which can be paired leaving only one mismatched predicate. This enables creative computing, which is defined to be qualitatively fuzzy. Finally, generalizations may be incrementally learned from the union of the property lists of their instances (as defined at the outset of this theorem). They may be most efficiently unlearned through process of re-learning and substitution.

Recall that the generalization of P13 and P14, in the proof of the corollary above, as well as elsewhere, required that a proper super class for apples and oranges, if any, be found. For example, fruits, a proper super class, grow on trees; whereas, baseballs, which are instances of the improper super class, "round things" do not. While we necessarily demonstrated how rule pairs could suggest context-free predicates for generalization by process of differentiation (e.g., apples and oranges), that process needs to be formalized through the use of property lists. Were the predicate differentiation not context free after randomization (see below), then while we could have collections of instances, we could not properly generalize them due to inherent context dependency. Thus, for example, just because kerosene is a fuel, does not mean that it may be used in automotive gas tanks.

Consider, prop (apples)={round, edible, sweet, grow-on-trees, prop (color)={red, green}, et al.}. The prop (oranges)={round, edible, sweet, grow-on-trees, prop (color)={orange}, et al.}. The prop (baseballs)={round, inedible, manufactured, stitched, prop (color)={white, dirty-white}, prop (size.circumference.inches)=[9, 9.25], prop [weight.ounces]=[5, 5.25]}. First, notice that property lists are dynamic and may thus grow as new data becomes available and shrink when old data falls off the list due to disuse. Second, notice that property lists may embed property lists ad infinitum. Thus, one property of apples is that they have the property of color, which may be red or green.

Property lists are hierarchically defined, which allows for their efficient comparison (and differencing) using symbolic processing languages like Common LISP.

Next, two or more objects may share a common property, but otherwise be incomparable. Thus, apples, oranges, and baseballs share round as their common property, but are otherwise incomparable. They do not share an instance of the property of color. Similarly, they do not share the property of size because though apples and oranges have known sizes; those sizes must first be added to their property lists though this will not affect a known generalization. Furthermore, notice that the size for baseballs is stated in terms of dotted pairs; namely, its' circumference, and that supplied in inches. Now, clearly algorithms exist to enable translation to/from size.radius.centimeters. However, such translations are implementation dependent and thus are not a cause for undue concern.

Next, consider the candidate generalization of apples and oranges. We find that prop (apples)∩prop (oranges)={round, edible, sweet, grow-on-trees, et al.}. We also have that prop (fruits)={{round, oval}, edible, sweet, {grow-on-trees, grow-on-ground}, et al.}. Now, prop (apples)∩(oranges)−prop (fruits)=NIL. However, prop (fruits)−prop (apples) ∩prop (oranges)={oval, grow-on-ground}. This means that while the properties common to apples and oranges generalizes to those common to fruits, the properties of fruits does not generalize to those properties (i.e., unidirectional generalization). The ∩ operation is useful for randomizing a context-sensitive set of predicates into a context-free one (e.g., substituting fruits in a context containing apples and oranges). This has the side benefit of increasing the likelihood of finding candidate generalizations, since the rule antecedents (and consequents) are terser/more general as a consequence. Clearly, randomization begets randomization. Replacing the ∩ operation with the union operation would be improper unless one means to merge the apples and oranges. Rather, each may be separately compared against the properties of fruits to see if each generalizes to fruits independently, which they do in this case.

The union operation may be used to create the property list for a generalization from the property lists of its known instances. However, the reverse operation of subtracting extinct properties from a generalization is not as practical because while growth can take place one instance at a time, reduction requires the simultaneous use of all instances (or reference counts maintained in a table, where there will be contention in association with parallel processing) so that valid properties are not lost. Such unlearning is not facilitated. Learning is. Furthermore, properties may be unlearned through their acquisition under a distinct mnemonic, expunging the one to be unlearned, and renaming the new mnemonic with the name of the expunged one. That is very human-like because we all have initial impressions on the meaning of a new concept, followed by uncertainty, and eventually followed by near certainty.

Bidirectional generalization implies that while the identifier is distinct, the meaning is the same (i.e., synonyms). However, even here, since the lists are dynamic and may be formed independently, the list having more properties will be the generalization (for at least the present). For example, if one is told that clou is French for nail, native English speakers tend to remember that clou is an instance of nail and not vice versa.

The capability for determining if one object is an instance of another provides an order of magnitude more capability to the inference engine. It can be observed that a context, which includes fruit, will trigger an antecedent, which includes say apple where, and this is important, any remaining context, after randomization, is a literal match for the antecedent predicates. Again, this requirement stems from the fact that not all fruits are substitutable and the remaining predicate context, if any, conditions this substitutability.

Simply put, this means that one need not use apple in a context, but one may not want to use fruit either. Instead, use the randomized property list of apples in its context and match it against the property lists of the antecedents. Also, randomization may proceed non-destructively across all the predicates of a context. That is, the same predicates may participate in more than one generalization. So long as the property lists are sufficiently defined, more general pattern matches will be obtained (i.e., creative computing). Creative computing is qualitatively fuzzy because it relaxes the requirement for literal predicate matches in favor of matching their defining properties (e.g., a rock can substitute for a hammer or a chair—depending on their relative property lists). Furthermore, the greater the number of predicates in the match, the more important it is to sufficiently define their property lists to avert contextual overgeneralization and the associated need for error correction. Again, the union operation may be used to dynamically update the property lists of generalizations from its known instances. (Known instances have a NIL difference.) Augmenting a generalization will not change the fact that it is a generalization, but might make it a new generalization of other instances. The 3-2-1 skew can be used to schedule such union operations.

Next, consider prop (baseballs)−prop (fruits)={inedible, manufactured, stitched, prop (color)={white, dirty-white}, prop (size.circumference.inches)=[9, 9.25], prop [weight-.ounces]=[5, 5.25]}. Then, consider prop (fruits)−prop (baseballs)={edible, sweet, {grow-on-trees, grow-on-ground} }. It follows that since neither resultant is NIL, though baseballs are round, and fruits can be round, neither is a proper generalization of the other. Similarly, it can be shown that neither apples nor oranges, is a proper instance or generalization of baseballs.

Amplifying existing knowledge, while maintaining a high level of validity, is fundamental to human reasoning, decision making, and the advancement of science. In the final analysis, this methodology captures symmetric knowledge to the extent that it blurs with random knowledge. It evidences that the machine learning of rules can be increasingly creative as a function of scale (and attendant processor capabilities). Unlike neural network paradigms, against which it may be compared, this methodology is capable of modus ponens and analogical reasoning. These serve as the basis for human-level symbolic reasoning, which is something that neural networks can never do. Most significantly, storing knowledge as a composition of transforms can exponentially increase the applicability of that knowledge in comparison to literal storage (e.g., simple production systems). This is possible through the use of carefully controlled (i.e., domain-specific) generalization.

Moreover, this approach holds the promise of providing semantics for information theory. The randomization that is offered goes beyond Kolmogorov complexity or Chaitin's randomization, which addresses the number of bits needed to represent a message, or similarly Shannon's communication theory, which addresses the number of bits needed to transmit a message over a channel. This approach to semantic randomization represents a prescription for learning to induce unknown knowledge from carefully generalized known knowledge. The degree of fuzzy randomization used can be translated into possibilities. The methodology would be capable of utilizing the capabilities of quantum computing if it should be possible to overcome de-coherence of the qbits with scale.

Advantages of the embodiments of the system and method disclosed herein include, but are not limited to the following:

a. Strictly numeric predictor antecedents may have their consequents defined as a mathematical function of the associated antecedents (e.g., min, max, mean, median, etc.), as appropriate. This eliminates the role of a corrector rule base, which is needed for qualitative transformation.
b. The method enables the qualitatively fuzzy mapping of situations to knowledge.
c. The method learns minimal context for analogical transformations.
d. The method learns to correct erroneous mappings through the use of a distinct corrector rule base.
e. Rules are expunged from the logical tail and rules that participate in the computation of a proper action(s) are moved to the logical head. This applies to both bases.
f. The method fuses rather than selects among competing solutions for more accurate predictions.
g. The method allows for non-deterministic predictor-corrector rule bases.
h. New rules are acquired in either rule base through the use of an interrupt mechanism.
i. There may be more than one action because if a minimal of m predicates (m≥0) must be deleted from every rule in the predictor base to obtain a covering, by the context, of at least one rule in this base, then all such deletions of m predicates, yielding a covering by the context, yield equally valid consequents.
j. The induced corrector context may not cover a rule antecedent in the corrector base—just as the predictor context may not cover a predictor antecedent in the predictor base. Here again, a minimal of n predicates (n≥0) is deleted from every rule in the corrector base to obtain a covering, by the corrector context, of at least one rule in the corrector base, where this base serves as a fixed point.
k. The method has a qualitative transforming corrector base, which is a mathematical fixed point. This means that it is self-correcting through an arbitrary number of iterations, as needed. Practically speaking, this maximally extends the number of contexts any given rule can contribute to mapping to a solution.
l. The method is consistent with gathering context through question-asking.
m. This design allows for every quantum of predictor-corrector knowledge to participate in numerous solutions.
n. The method allows for the creation of analogical knowledge through process of generalization. Thus, analogical knowledge evolves around domain-specific knowledge instead of by direct domain transformation
o. The method minimally generalizes the situational part of a rule to obtain a covering by the context(s).
p. This also allows the mapping of cases to rules, minimizing the effort required to acquire knowledge.
q. The method allows for fuzzy qualitative reasoning. Thus, segmented rule bases can communicate with each other in a networked system of systems configuration to solve extremely complex problems—including ones for which critical knowledge may be missing.
r. A networked method system of systems learns how to learn as a function of scale. The qualitative fuzziness removes brittleness, which prevents expert systems from laying claim to the same (i.e., even without the capability for prediction/correction).
s. The method may forget previous knowledge due to storage limitations and occasional overwrites. However, unlike neural networks, reacquisition takes but a single example and this example, again unlike neural networks is capable of modus ponens.
t. The method creates a duality between random and symmetric knowledge. This is a realization of a stipulation of randomization theory, which predicts the convergence of random and symmetric knowledge with increasing complexity.
u. The principle of duality allows for the fusion of multiple analogs to increase the validity of the result.
v. Learned knowledge is amplified by all of the implied and fused analogs to it at run time—saving space over previous designs. As a result, the method can come up with seemingly random knowledge having relatively high probabilities of validity.
w. Each produced action is associated with a possibility metric.
x. A metaphorical explanation subsystem traces all system actions to the iterative fusion of similar ones in the predictor and corrector rule bases.
y. The method is capable of abstract reasoning as a consequence of iterative correction.
z. The method thus also serves as a model for holographic memory, since knowledge may be distributed throughout the rules in a base (as well as across the segmented bases).

Further, the disclosed method is unique among intelligent systems in that it allows for the networking of not necessarily deductive domain-specific symbolic reasoners. That is, knowledge may be segmented, where each segment can be captured using the predictor-corrector methodology. Each such subsystem may call each other to solve complex problems, which may be decomposed into domain-specific constituents (e.g., a crop-planting subsystem calls a weather prediction subsystem and the like). Unlike a similar arrangement of expert systems, the method can work with qualitatively fuzzy knowledge. That is to say that it can reason with uncertain knowledge and effectively fuse partial results, through the corrector to arrive at new knowledge with minimal loss of validity. Generalization allows for analogical reasoning without necessary knowledge of the specific domain. Rather, a preponderance of evidence allows a context to cover more constraining situations (i.e., sometimes by asking questions to gather additional context).

The disclosed method also differs from numeric predictor-corrector methods in that predictions and corrections are usually qualitative. This allows the corrector to serve as a fixed-point corrector for itself. It means that acquired corrections can have a broad impact, which extend well-beyond the initial corrected rule. In other words, a system utilizing the method learns how to learn with ever-increasing rapidity. A system of systems utilizing the method can define a true symbolic reasoner (intelligent system), which continues to function in the absence of complete and often otherwise critical knowledge.

FIGS. 4A and 4B show flowcharts of an embodiment of a method 300 in accordance with the Predictor-Corrector Method for Knowledge Amplification by Structured Expert Randomization. Some or all of the steps of method 300 may be performed in accordance with system 10 shown in FIG. 1 and by a computer having a processing device connected thereto, such as computer 200 shown in FIG. 3 or system 100 shown in FIG. 2. Further, while FIGS. 4A and 4B show one embodiment of method 300 including steps 302-348, other embodiments of method 300 may contain fewer steps or more steps. Further, while in some embodiments the steps of method 300 may be performed as shown in FIGS. 4A and 4B, in other embodiments the steps may be performed in a different order, or certain steps may occur simultaneously with one or more other steps.

Referring to FIG. 4A, method 300 may begin at step 302, which involves acquiring a context. As an example, in some embodiments the context is user-supplied while in other embodiments the context is supplied by a networked computing system. Step 304 involves searching the predictor case base for cases containing predictor antecedents that cover the acquired context. At step 306, a determination is made whether or not the predictor case base is empty. If so, step 308 involves acquiring a rule for the case base, where the rule antecedent is the acquired context and the rule consequent is determined, for example, from feedback received from a user of the system.

If at step 306 it is determined that the case base is not empty, step 310 involves a determination whether or not a single match was made. If so, step 312 involves a determination whether or not the match is correct. As an example, this may occur by input from a user of the system. If the match is not correct, the method proceeds to step 308 to acquire a new rule as discussed above. If the match is correct, step 314 involves firing the consequent associated with the predicate antecedent that was matched to the acquired context.

If step 310 involved a determination that a single match was not made, step 316 involves a determination as to whether or not multiple matches were made. If so, step 318 involves creating a corrector context for use with the corrector case base. In some embodiments, the corrector context is created by the union of predictor consequents associated with the matched predictor antecedents, as discussed in the above examples. If multiple matches were not determined at step 316, meaning that no matches were made, step 320 involves creating a least-generalized predictor antecedent.

In some embodiments, step 320 involves, for all predictor antecedents in the predictor rule base, creating predictor resultants by subtracting the respective predictor contexts from the respective predictor antecedents. Next, the one or more predictor resultants having the minimal number of predictor resultant terms are selected. Then, the one or more least-generalized predictor antecedents are created by subtracting the predictor resultant term from the associated predictor antecedent for each of the selected predictor resultants, as discussed in the above examples.

Step 322 involves a determination as to whether or not more than one least-generalized predictor antecedents were created. More than one may be created if more than one generalized rules exist that include the least amount of deleted predicates and fully cover the context. If so, the method proceeds to step 318 to create a corrector context as discussed above. If only one least-generalized predictor antecedent is created, step 324 involves firing the consequent associated with the predictor antecedent.

Referring to FIG. 4B, method 300 repeats a similar processing pattern as shown in FIG. 4A, but this time in the context of using corrector rule base 30 vice predictor rule base 20. The corrector case base 30 serves to correct the output of the predictor case base 20, as well as the non-deterministic output of the corrector case base 20. From step 318 in FIG. 4A, method 300 proceeds to step 326 to search the corrector case base using the created corrector context.

At step 328, a determination is made whether or not the corrector case base is empty. If so, step 330 involves acquiring a rule for the corrector case base, where the rule antecedent is the acquired context and the rule consequent is determined, for example, from feedback received from a user of the system.

If at step 328 it is determined that the case base is not empty, step 332 involves a determination whether or not a single match was made. If so, step 334 involves a determination whether or not the match is correct. As an example, this may occur by input from a user of the system. If the match is not correct, the method proceeds to step 330 to acquire a new rule as discussed above. If the match is correct, step 336 involves firing the consequent associated with the corrector antecedent that was matched to the corrector context.

If step 332 involved a determination that a single match was not made, step 338 involves a determination as to whether or not multiple matches were made. If so, step 340 involves creating new corrector context for input back into the corrector case base. As an example, the new corrector context is created by the union of corrector consequents associated with the matched corrector antecedents, as discussed in the above examples. If multiple matches were not determined at step 338, meaning that no matches were made, step 342 involves creating a least-generalized corrector antecedent.

In some embodiments, step 342 involves, for all corrector antecedents in the corrector rule base, creating corrector resultants by subtracting the respective corrector contexts from the respective corrector antecedents. Next, the one or more corrector resultants having the minimal number of corrector resultant terms are selected. Then, the one or more least-generalized corrector antecedents are created by subtracting the corrector resultant term from the associated corrector antecedent for each of the selected corrector resultants, as discussed in the above examples.

Step 344 involves a determination as to whether or not more than one least-generalized corrector antecedents were created. More than one may be created if more than one generalized rules exist that include the least amount of deleted predicates and fully cover the context. If so, the method proceeds to step 346 to fire the most recently fired or acquired consequents. If only one least-generalized corrector antecedent is created, step 348 involves firing the consequent associated with the corrector antecedent.

Some or all of the steps of method 300 may be stored on a non-transitory computer readable storage medium, wherein the steps are represented by computer readable programming code. The steps of method 300 may also be computer-implemented using a programmable device, such as a computer-based system. Method 300 may comprise instructions that, when loaded into a computer-based system, cause the system to execute the steps of method 300. Method 300 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

The language used in the specification has been principally selected for readability and instructional purposes, and may not have been selected to delineate or circumscribe the inventive subject matter. Accordingly, the disclosure of the inventive subject matter is intended to be illustrative, but not limiting, of the scope of the invention, which is set forth in the following claims.

Further, many modifications and variations of the Predictor-Corrector Method for Knowledge Amplification by Structured Expert Randomization are possible in light of the above description. Within the scope of the appended claims, the Predictor-Corrector Method for Knowledge Amplification by Structured Expert Randomization may be practiced otherwise than as specifically described. Further, the scope of the claims is not limited to the implementations and embodiments disclosed herein, but extends to other implementations and embodiments as contemplated by those having ordinary skill in the art.

I claim:

1. A computer-implemented method comprising the steps of:
    determining that a predictor case base containing predictor rules having predictor antecedents and associated predictor consequents does not contain a predictor rule having a predictor antecedent covered by an acquired predictor context;
    creating one or more least-generalized predictor antecedents that are covered by the acquired predictor context;
    creating a corrector context using the predictor consequents associated with the one or more least-generalized predictor antecedents;
    determining that a corrector case base containing corrector rules having corrector antecedents and associated corrector consequents contains a corrector rule having a corrector antecedent covered by the corrector context; and
    firing the corrector consequent associated with the corrector antecedent covered by the corrector context.

2. The computer-implemented method of claim 1, wherein the step of creating one or more least-generalized predictor antecedents that are covered by the predictor context comprises the steps of:
    for all predictor antecedents in the predictor rule base, creating predictor resultants by subtracting the respective predictor contexts from the respective predictor antecedents;
    selecting the one or more predictor resultants having the minimal number of predictor resultant terms; and
    creating the one or more least-generalized predictor antecedents by subtracting the predictor resultant term from the associated predictor antecedent for each of the selected predictor resultants.

3. The computer-implemented method of claim 2 further comprising the step of providing a possibility metric along with the fired corrector consequent, wherein the possibility metric is inversely proportional to the number of predictor resultant terms deleted from the associated predictor antecedent.

4. The computer-implemented method of claim 1, wherein the corrector context is created by the union of predictor consequents associated with the least-generalized predictor antecedents.

5. The computer-implemented method of claim 1, wherein if the predictor case base is empty, the method further comprises the step of acquiring a predictor rule, wherein the acquired predictor context serves as the predictor antecedent and a user-validated response serves as the predictor consequent.

6. The computer-implemented method of claim 1, wherein if the corrector case base is empty, the method further comprises the step of acquiring a corrector rule, wherein the corrector context serves as the corrector antecedent and a user-validated response serves as the corrector consequent.

7. The computer-implemented method of claim 1 further comprising the steps of:
    determining that the corrector case base contains more than one corrector rules having a corrector antecedent covered by the corrector context; and
    creating a revised corrector context from the union of the corrector consequents associated with the corrector antecedents covered by the corrector context.

8. The computer-implemented method of claim 1 further comprising the steps of:
    determining that the corrector case base does not contain a corrector rule having a corrector antecedent covered by the corrector context; and
    creating at least one least-generalized corrector antecedent covered by the corrector context.

9. The computer-implemented method of claim 8 further comprising the steps of:
    firing the corrector consequent associated with the corrector antecedent covered by the least-generalized corrector context if one least-generalized corrector antecedent is covered by the corrector context; and
    firing the corrector consequent associated with the most-recently fired rule having a corrector antecedent covered by the least-generalized corrector context.

10. The computer-implemented method of claim 8, wherein the step of creating at least one least-generalized corrector antecedent covered by the corrector context comprises the steps of:
    for all corrector antecedents in the corrector rule base, creating corrector resultants by subtracting the respective corrector contexts from the respective corrector antecedents;
    selecting the one or more corrector resultants having the minimal number of corrector resultant terms; and
    creating the at least one least-generalized corrector antecedent by subtracting the corrector resultant term from the associated corrector antecedent for each of the selected corrector resultants.

11. The computer-implemented method of claim 1, wherein the predictor consequent associated with a strictly numeric predictor antecedent is defined as a mathematical function of the associated predictor antecedent.

12. A system comprising:
    a computer having a computer input device and a display device connected thereto; and
    a plurality of distributed processors communicatively coupled to the computer, wherein the computer is configured to coordinate the activities of the distributed processors, wherein each of the distributed processors is configured as a separate domain-specific knowledge-base segment and is further configured to perform a method comprising the steps of:
determining that a predictor case base containing predictor rules having predictor antecedents and associated predictor consequents does not contain a predictor rule having a predictor antecedent covered by an acquired predictor context;
creating one or more least-generalized predictor antecedents that are covered by the acquired predictor context;
creating a corrector context using the predictor consequents associated with the one or more least-generalized predictor antecedents;
determining that a corrector case base containing corrector rules having corrector antecedents and associated corrector consequents contains a corrector rule having a corrector antecedent covered by the corrector context; and
firing the corrector consequent associated with the corrector antecedent covered by the corrector context.

13. The system of claim 12, wherein the step of creating one or more least-generalized predictor antecedents that are covered by the predictor context comprises the steps of:
for all predictor antecedents in the predictor rule base, creating predictor resultants by subtracting the respective predictor contexts from the respective predictor antecedents;
selecting the one or more predictor resultants having the minimal number of predictor resultant terms; and
creating the one or more least-generalized predictor antecedents by subtracting the predictor resultant term from the associated predictor antecedent for each of the selected predictor resultants.

14. The system of claim 12, wherein each of the plurality of distributed processors are further configured to perform the step of providing a possibility metric along with the fired corrector consequent, wherein the possibility metric is inversely proportional to the number of predictor resultant terms deleted from the associated predictor antecedent.

15. The system of claim 12, wherein each of the plurality of distributed processors are configured to create the corrector context by using the union of predictor consequents associated with the least-generalized predictor antecedents.

16. The system of claim 12, wherein each of the plurality of distributed processors are configured to further perform the steps of:
if the predictor case base is empty, acquiring a predictor rule, wherein the acquired predictor context serves as the predictor antecedent and a user-validated response serves as the predictor consequent; and
if the corrector case base is empty, acquiring a corrector rule, wherein the corrector context serves as the corrector antecedent and a user-validated response serves as the corrector consequent.

17. The system of claim 12, wherein each of the plurality of distributed processors are configured to further perform the steps of:
determining that the corrector case base contains more than one corrector rules having a corrector antecedent covered by the corrector context; and
creating a revised corrector context from the union of the corrector consequents associated with the corrector antecedents covered by the corrector context.

18. The system of claim 12, wherein each of the plurality of distributed processors are configured to further perform the steps of:
determining that the corrector case base does not contain a corrector rule having a corrector antecedent covered by the corrector context;
creating at least one least-generalized corrector antecedent covered by the corrector context;
firing the corrector consequent associated with the corrector antecedent covered by the least-generalized corrector context if one least-generalized corrector antecedent is covered by the corrector context; and
firing the corrector consequent associated with the most-recently fired rule having a corrector antecedent covered by the least-generalized corrector context.

19. The system of claim 18, wherein the step of creating at least one least-generalized corrector antecedent covered by the corrector context comprises the steps of:
for all corrector antecedents in the corrector rule base, creating corrector resultants by subtracting the respective corrector contexts from the respective corrector antecedents;
selecting the one or more corrector resultants having the minimal number of corrector resultant terms; and
creating the at least one least-generalized corrector antecedent by subtracting the corrector resultant term from the associated corrector antecedent for each of the selected corrector resultants.

20. A method comprising the steps of:
establishing a predictor case base containing predictor rules having predictor antecedents and associated predictor consequents and a corrector case base containing corrector rules having corrector antecedents and associated corrector consequents, wherein the predictor antecedents and the corrector antecedents each comprise unknown processes of a format including one or more of a process identification, a process type, a primary memory requirement, a secondary memory requirement, a minimum processor speed, and a processor core requirement, and wherein the predictor consequents and the corrector consequents each comprise known processors of a format including one or more of the processor identification, the processor type, the primary memory requirement, the secondary memory requirement, the minimum processor speed, the processor core requirement, and a processor power requirement;
acquiring a predictor context comprising an unknown process of a format including one or more of the process identification, the process type, the primary memory requirement, the secondary memory requirement, the minimum processor speed, and the processor core requirement;
determining that the predictor case base does not contain a predictor rule having a predictor antecedent covered by the acquired predictor context;
creating one or more least-generalized predictor antecedents that are covered by the acquired predictor context;
creating a corrector context using the predictor consequents associated with the one or more least-generalized predictor antecedents;
determining that the corrector case base contains a corrector rule having a corrector antecedent covered by the corrector context; and
firing the corrector consequent associated with the corrector antecedent covered by the corrector context, wherein the unknown process of the acquired context is mapped to a known processor of the corrector case base.

* * * * *